United States Patent [19]

Lee et al.

[11] Patent Number: 4,939,639
[45] Date of Patent: Jul. 3, 1990

[54] METHOD OF FACILITATING COMPUTER SORTING

[75] Inventors: Eddy Lee, North York; Eugene Kulinek, Toronto, both of Canada

[73] Assignee: Northern Telecom Limited, Montreal, Canada

[21] Appl. No.: 61,510

[22] Filed: Jun. 15, 1987

[51] Int. Cl.$^5$ .................... G06F 7/08; G06F 15/38; G06F 7/00
[52] U.S. Cl. .................... 364/200; 364/300; 364/900; 364/222.9; 364/962.3; 364/419
[58] Field of Search ... 364/200 MS File, 900 MS File, 364/419, 300

[56] References Cited

U.S. PATENT DOCUMENTS

| | | | |
|---|---|---|---|
| 4,295,206 | 10/1981 | Cain et al. | 364/900 |
| 4,425,617 | 1/1984 | Sherwood | 364/900 |
| 4,498,143 | 2/1985 | Strzelecki | 364/900 |
| 4,632,578 | 12/1986 | Cuff et al. | 364/900 |
| 4,706,212 | 11/1987 | Toma | 364/900 |
| 4,758,979 | 7/1988 | Chiao-Yuch | 364/900 |
| 4,809,158 | 2/1989 | McCauley | 364/200 |
| 4,860,206 | 8/1989 | Kugimiya et al. | 364/419 |
| 4,873,625 | 10/1989 | Archer et al. | 364/200 |

OTHER PUBLICATIONS

IBM PC Assembly Language—Leo J. Scanlon, 1983, pp. 248-250, Microsoft MS-DOS.
User's Guide and User's Reference, p. 298.

Primary Examiner—Allen MacDonald
Assistant Examiner—Gopal C. Ray
Attorney, Agent, or Firm—Robert C. Hogeboom; John E. Mowle

[57] ABSTRACT

A method of facilitating the alphabetical dictionary sorting, by computer, of words based upon characters from a multilingual alphabet, especially the repertoire of characters defined in the new standard alphabet known as ISO 8859/1. This invention uses an encoding scheme to determine the language dependent sort orders for the characters defined in ISO 8859/1. This encoding scheme removes the dependency of sorting on the character set's internal collating representation. This method allows the same sorting software to support many (if not all) of the languages supported by the alphabet. By storing the language dependent sort orders as data files, the sorting software is immune to the user's language and hence is highly portable. The number of languages supported is directly proportional to the number of data files available.

2 Claims, 10 Drawing Sheets

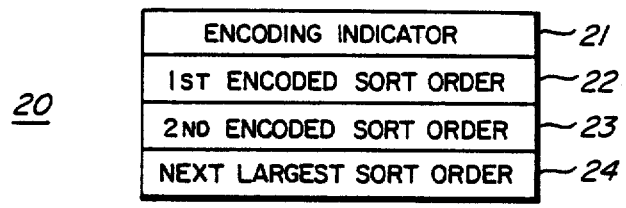
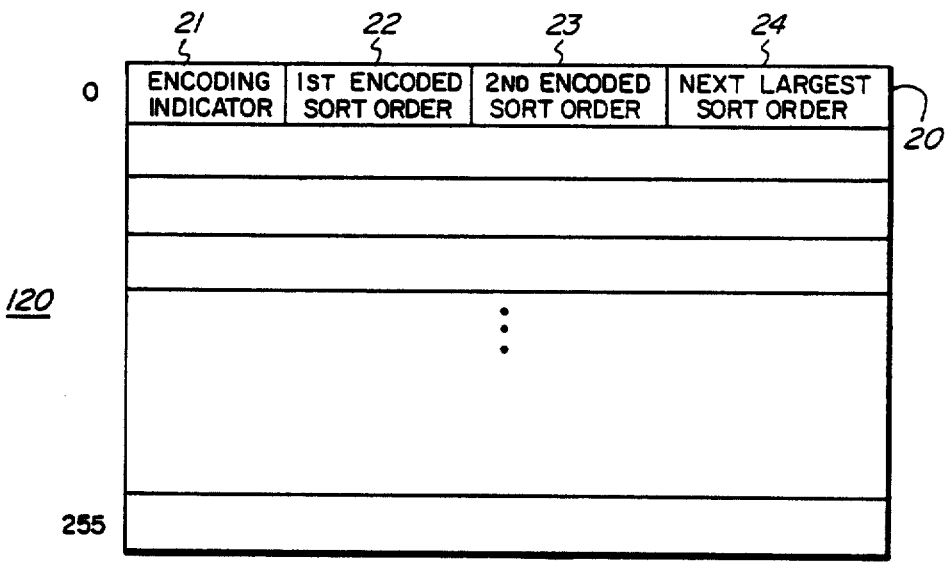
FIG. 1A
FIG. 1B
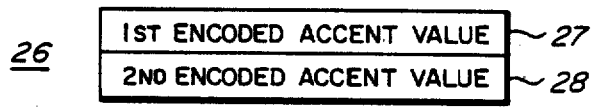
ACCENT PRIORITY ENCODING RECORD
FIG. 2A

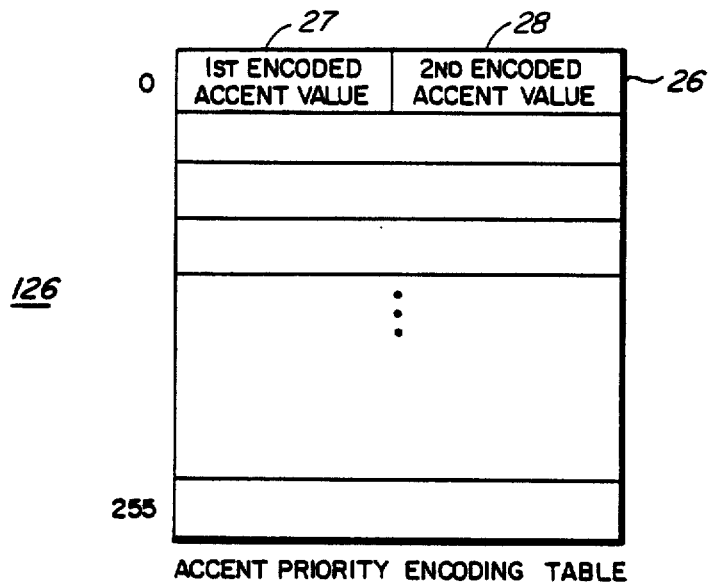
ACCENT PRIORITY ENCODING TABLE
FIG. 2B
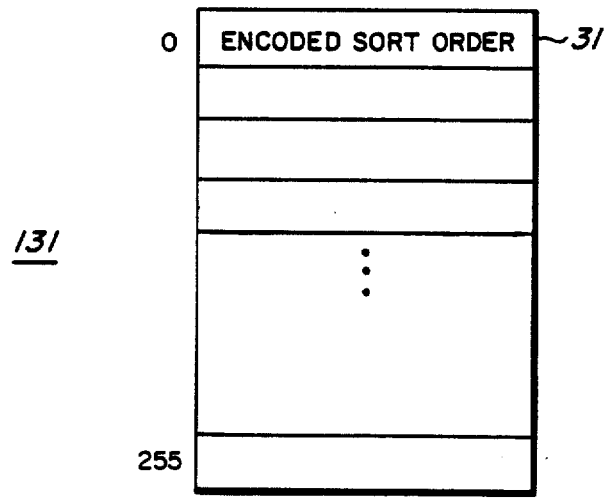
NON-ALPHANUMERICAL CHARACTER ENCODING RECORD
FIG. 3A
NON-ALPHANUMERICAL CHARACTER ENCODING TABLE
FIG. 3B

| b8 b7 b6 b5 \ b4 b3 b2 b1 | | 0 0 0 0 | 0 0 0 1 | 0 0 1 0 | 0 0 1 1 | 0 1 0 0 | 0 1 0 1 | 0 1 1 0 | 0 1 1 1 | 1 0 0 0 | 1 0 0 1 | 1 0 1 0 | 1 0 1 1 | 1 1 0 0 | 1 1 0 1 | 1 1 1 0 | 1 1 1 1 |
|---|---|---|---|---|---|---|---|---|---|---|---|---|---|---|---|---|
| | | 00 | 16 | 32 | 48 | 64 | 80 | 96 | 112 | 128 | 144 | 160 | 176 | 192 | 208 | 224 | 240 |
| 0 0 0 0 | 00 | | | SP | 0 | @ | P | ` | p | | | NBSP | ° | À | Ð | à | ð |
| 0 0 0 1 | 01 | | | ! | 1 | A | Q | a | q | | | ¡ | ± | Á | Ñ | á | ñ |
| 0 0 1 0 | 02 | | | " | 2 | B | R | b | r | | | ¢ | ² | Â | Ò | â | ò |
| 0 0 1 1 | 03 | | | # | 3 | C | S | c | s | | | £ | ³ | Ã | Ó | ã | ó |
| 0 1 0 0 | 04 | | | $ | 4 | D | T | d | t | | | ¤ | ´ | Ä | Ô | ä | ô |
| 0 1 0 1 | 05 | | | % | 5 | E | U | e | u | | | ¥ | µ | Å | Õ | å | õ |
| 0 1 1 0 | 06 | | | & | 6 | F | V | f | v | | | ¦ | ¶ | Æ | Ö | æ | ö |
| 0 1 1 1 | 07 | | | ' | 7 | G | W | g | w | | | § | · | Ç | × | ç | ÷ |
| 1 0 0 0 | 08 | | | ( | 8 | H | X | h | x | | | ¨ | , | È | Ø | è | ø |
| 1 0 0 1 | 09 | | | ) | 9 | I | Y | i | y | | | © | ¹ | É | Ù | é | ù |
| 1 0 1 0 | 10 | | | * | : | J | Z | j | z | | | ª | º | Ê | Ú | ê | ú |
| 1 0 1 1 | 11 | | | + | ; | K | [ | k | { | | | « | » | Ë | Û | ë | û |
| 1 1 0 0 | 12 | | | , | < | L | \ | l | | | | | ¬ | ¼ | Ì | Ü | ì | ü |
| 1 1 0 1 | 13 | | | - | = | M | ] | m | } | | | SHY | ½ | Í | Ý | í | ý |
| 1 1 1 0 | 14 | | | . | > | N | ^ | n | ~ | | | ® | ¾ | Î | Þ | î | þ |
| 1 1 1 1 | 15 | | | / | ? | O | _ | o | | | | ¯ | ¿ | Ï | ß | ï | ÿ |

FIG. 11

METHOD OF FACILITATING COMPUTER SORTING

This invention relates generally to alphabetical sorting by computer, and more particularly to the alphabetical sorting, by computer, of words based upon a multilingual alphabet.

BACKGROUND OF THE INVENTION

To date, the most widely used code standard for alphanumeric characters has been ASCII (American Standard Code for Information Interchange) which is a 7-bit binary code standardized by ANSI (American National Standards Institute). As the only letters that ASCII supports are the English letters, its implementation in information processing and interchange environments has been limited to English. As a result, a large number of computer systems today communicate in the English language only.

In recent years, the computer industry has recognized the need to support the non-English Latin-based languages in order to facilitate communication with a non-technical user who often is familiar with only his native language. Hence, a new 8-bit multilingual character set was defined by ISO (International Standards Organization) in 1986. That set has already gained a broad support from the industry and various national standard organizations. The name of the character set is Latin Alphabet #1 and it has been documented in the ISO Standard as ISO 8859/1. It supports 14 Western European and Western Hemisphere languages that are used in 45 countries around the world.

The set of languages and characters supported by the ISO standard ISO 8859/1—"Information Processing—8 bit single byte coded graphic character sets Part Latin Alphabet #1" is believed to include most of those that are used in North America, Western Europe and Western Hemisphere. They are listed below:

Danish, Dutch, English, Faeroese, Finnish, French, German, Icelandic, Irish, Italian, Norwegian, Portuguese, Spanish and Swedish. These languages are believed used in at least the following countries:

| Argentina | Finland | Panama |
|---|---|---|
| Australia | France | Paraguay |
| Austria | Germany | Peru |
| Belgium | Guatemala | Portugal |
| Bolize | Guyana | El Salvador |
| Bolivia | Honduras | Spain |
| Brazil | Iceland | Surinam |
| Canada | Ireland | Sweden |
| Chile | Italy | Switzerland |
| Colombia | Liechtenstein | The Netherlands |
| Costa Rica | Luxembourg | UK |
| Cuba | Mexico | USA |
| Denmark | New Zealand | Uruguay |
| Ecuador | Nicaragua | Venezuela |
| Faroe Islands | Norway | |

Returning now to the ASCII Character set, the main advantage embodied by the English language with regard to sorting is that the alphabetical order of the letters in the English alphabet corresponds to the internal numerical collating sequence in the ASCII set. This special feature makes the sorting of English language strings relatively simple and in most cases efficient.

For example, to sort two characters, the following operations are performed:

(1) Convert the cases of both characters into the same one (i.e. the characters become caseless).
(2) Use straight comparison of codes (ordinal values) of both characters to determine the relative sort orders. The character whose ordinal value is smaller is collated first (in ascending order sorting).

Some limitations of this method of sorting, based upon the ASCII character set, include the following:

(1) Most, if not all sorting algorithms published so far assume that the underlying character set is the 7-bit ASCII set (or in some rare cases the EBCDIC set) which does not support foreign letters. As a result, these algorithms are not capable of sorting properly most non-English Latin-based languages.
(2) The existing sorting methods for English and other languages cannot handle sorting properly when foreign letters are included. This should never happen if the computer system uses the national character sets which contain only letters in their languages. However, the problem of dealing with foreign letters in sorting does come up when 8-bit character sets are supported since those sets contain more letters than those that are used domestically.
(3) The existing algorithms cannot properly handle sorting in a multilingual environment in which information from the same database can be accessed by users using different languages.

To handle multilingual sorting properly, the following issues should be addressed.

(1) The collating sequence of letters in the Latin Alphabet #1 (or any other multilingual set) does not correspond to the alphabetical order of the letters in all the supported languages. This means sorting can no longer rely on the collating sequence imposed by the character set.
(2) The main idea of sorting in a multilingual environment is to have data sorted in the user's own language. The data stored does not have to be necessarily in the user's language and, in fact, it can be made up of several different languages. Hence, a sorting operation is needed that is capable of supporting different sorting orders dependent on the users' languages. For example, the letter "A" is sorted after "Z" in Swedish whereas it is sorted the same as an "A" in German.
(3) In some languages, there are cases where letters with different internal representation are sorted as if they had the same representation (e.g. "V" and "W" in Swedish are collated the same). This undoubtedly creates a difficulty if one is thinking about using internal representation as a means to tackle the sorting problem.
(4) The sorting software should be able to collate foreign letters correctly among the domestic letters. This kind of transliteration is definitely language dependent.

To give a better picture of the problems when multilingual character sets are supported, the sort orders of four illustrative languages are outlined below. Language 1 might be English, language 2 might be Swedish, language 3 might be German and language 4 might be French. Letters which have the same alphabetical order are enclosed in braces. Note that priority rules apply to those letters which are enclosed in braces and differ only by accent.

(1) Language 1:
  Lower case: a b c d e f g h i j k l m n o p q r s t u v w x y z Upper Case: A B C D E F G H I J K L M N O P Q R S T U V W X Y Z (2) Language 2:
Lower Case: a b c d {e é} f g h i j k l m n o p q r s t u {v w} x {y Ü} z å ä ö
Upper Case: A B C D {E É} F G H I J K L M N O P Q R S T U {V W} X {Y Ü} Z Å Ä ö

(3) Language 3:
Lower Case: {a ä} b c d e f g h i j k l m n {o ö} p q r s β t {u ü} v w x y z
Upper Case: {A Ä} B C D E F G H I J K L M N {O ö} P Q R S β T {U Ü} V W X Y Z (4) Language 4:
Lower Case: {a à â} b {c ç} d {e é e,gra/e/ ê ë} f g h {i î ï} j k l m n {o ô} p q r s t {u ù û ü} v w x y z
Upper Case: {A À Â} B { C ç}D {E É È Ê Ë} F G H {I Î Ï} J K L M N {O Ô} P Q R S T {U Ù Û Ü} V W X Y Z

SUMMARY OF THE INVENTION

The character set defined in ISO 8859/1 has received wide support from the computer industry in both North America and Western Europe. The new sorting methods of the present invention can be incorporated into computer systems that are based on the above character set standard. Also, the methods can be applied to systems that use other 8-bit one-byte encoded character set standards with only minor modifications.

The sorting methods of the present invention allow the same algorithm (software) to support any of the 14 languages listed earlier. The main reason is that the present invention uses a standard encoding scheme to encode sort orders for all the letters defined in ISO 8859/1. This encoding scheme removes the dependency of sorting on the character set's internal collating representation.

By storing the language dependent sort orders as data files, the sorting software is immune to the users' languages and hence is highly portable and cost effective since only one set of software has to be maintained. The number of languages supported is directly proportional to the number of data files available. This implies no software changes are needed when a new language is supported. Instead, a new data file has to be defined and installed.

To support the sorting of foreign letters, "transliteration" is used to ensure foreign letters are sorted where users are most likely expected to look for them. This includes both geometrical similarity and phonetic rules.

The sorting methods of the present invention support the following features:

(1) Characters that do not appear in a language should be sorted where users of that language might be expected to look for them.

(2) In all cases, all punctuations and non-alphanumerical characters except blank are to be ignored if they appear among numerics and alphabetics (e.g. Ada/-Bobby Co. is sorted as AdaBobby Co). If the name contains just punctuations and/or non-alphanumerical characters, then those characters should be preserved (e.g. ***, [*], /*/, etc.). In this case, these non-alphanumerical characters would be ordered before the digits and letters.

(3) Sorting operations must support one-to-two substitutions for some characters. For example, the 'β' from language 3 is sorted as though it were "ss" in language 1.

(4) Sorting operations must support two-to-one substitutions for some characters. For example, in Spanish the letter pairs 'ch' and 'll' are sorted as if they were single letters and they are sorted between 'cz' and 'd' and between 'lz' and 'm' respectively.

(5) Sorting operations must support accent priority. This means accented/non-accented letters are given different ordering when all the letters in the strings being compared are equal except for the accents (e.g. "Ellen" is collated before "Éllen"). For example, in English the 'a' vowels (with or without accent) are treated as equal except for priority. Their priority order is: A Á À Â Ã Ä Å. Note that priority among accents might vary between different languages.

(6) The sort orders among non-alphanumerical characters (punctuations and symbols) are not expected to be language dependent. Hence, the language dependency of sorting would be determined by letters and accents.

The present invention is directed to a method of tokenizing sorting orders apart from using internal collating sequences imposed by the character set employed, including the step of transliterating "foreign" letters according to geometrical or phonetic similarity for the purpose of defining the sorting order.

Stated in other terms, the present invention is a method of facilitating the alphabetical sorting, by computer, of words based upon characters from a multilingual alphabet, the method characterized by the steps of maintaining a master file of the words to be sorted and providing a data file for each language to be supported, the data file provided to facilitate modification of the master file in a predetermined fashion prior to performing the alphabetical sorting whereby the words are put into a form independent of a specific language character set's internal representation for the subsequent act of alphabetization.

BRIEF DESCRIPTION OF THE DRAWINGS

The invention will now be described in more detail with reference to the accompanying drawings wherein like parts in each of the several figures are identified by the same reference character, and wherein:

FIG. 1A is a simplified block diagram depicting the record structure of the present invention for handling the alphanumerical characters supported by ISO 8859/1;

FIG. 1B is a simplified block diagram depicting an alphanumerical character encoding table for the present invention;

FIG. 2A is a simplified block diagram depicting the record structure of the present invention for handling the priorities of accents supported by ISO 8859/1;

FIG. 2B is a simplified block diagram depicting an accent encoding table for the present invention;

FIG. 3A is a simplified block diagram depicting the record structure of the present invention for handling the non-alphanumerical characters supported by ISO 8859/1;

FIG. 3B is a simplified block diagram depicting a non-alphanumerical character encoding table for the present invention;

FIG. 11 is a chart depicting Latin alphabet #1 of ISO 8859/1;

Figure 4:
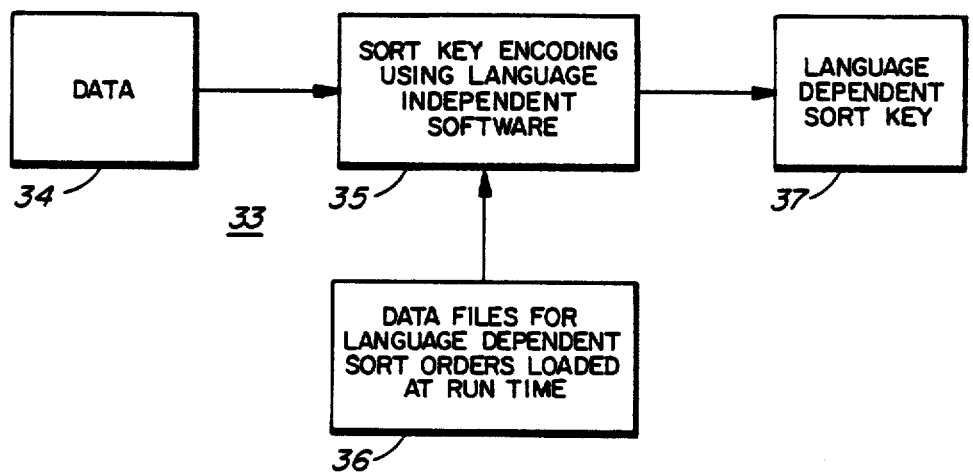
FIG. 4 is a simplified block diagram depicting the overall sortkey encoding process of the present invention.

Appendix A is a simplified pseudocode listing useful for understanding the present invention;

Appendix B is a glossary of certain terms used in the description of the present invention;

Appendix C is a table showing the correspondence between the characters of some different languages;

Appendix D is an alphanumerical character encoding table for language 1;

Appendix E is an alphanumerical character encoding table for language 5;

Appendix F is an accent priority encoding table for languages 1 and 5; and

Appendix G is a non-alphanumerical character encoding table for languages 1 and 5.

DETAILED DESCRIPTION

Unlike the sorting sequence of ASCII, the sorting sequences of the ISO 8859/1 characters do not correspond to any of the sort orders of the fourteen languages supported by the present invention. According to the present invention, language dependent sortkeys which are based on users' languages are formed before normal sorting packages can be used.

The present invention permits language dependent sorting to be handled by language independent software. This means that the same set of software is portable to support sorting when different languages have to be supported. The language dependent sort orders are loaded from data files at run time. The sort orders are created by a utility program which creates the data for the three encoding tables (tables 120, 126, and 131 of FIGS. 1B, 2B, and 3B respectively) used by the encoding software (Appendix A).

There are two encoding tables (an alphanumerical character encoding table 120, FIG. 1B, and an accent priority encoding table 126, FIG. 2B) associated with each language supported, whereas the third table (non-alphanumerical character encoding table 131, FIG. 3B) is common for all the languages supported (as listed under the section "Background of the Invention"). Each table has 256 entries so that all characters supported by the ISO 8859/1 character set can be represented.

The alphanumerical character encoding records 20 (FIG. 1) are used to encode digits (numerical characters) and letters (alphabetical characters). Each character requires four bytes of information. Byte 21 is used to indicate whether the encoding is 1-to-1, 1-to-2, 2-to-2, or ignore. Note that "0" indicates 1-to-1, "1" indicates 1-to-2, "2" indicates 2-to-2, and "255" indicates ignore.

If encoding indicator 21 is "0" (i.e. 1-to-1), then only the first encoded sort order byte 22 is used to store the encoded sort order of the character entry whereas the second encoded sort order byte 23 and the next largest sort order byte 24 are unused.

If encoding indicator 21 is "1" (i.e. 1-to-2), then the first encoded sort order byte 22 and the second encoded sort order byte 23 are both used to store the two corresponding encoded sort orders of the character entry and the next largest sort order byte 24 is unused.

If encoding indicator 21 is "2" (i.e. 2-to-2), then all the other three bytes (first encoded sort order 22, second encoded sort order 23, and next largest sort order 24) will be used to store encoding information. The first encoded sort order 22 is used to store the encoded sort order of the character entry (e.g. the value 78 for the character "C", FIG. 7). The second encoded sort order 23 is used to store the encoded sort order of the second character of the pair (e.g. the value 83 for the letter "H" in the two character pair "CH"). The next largest sort order 24 is used to store the encoded sort order of the largest sort order defined in that language (e.g. 102 in the FIG. 7 example).

Encoding indicator byte 21 provides the correct response for both the cases of 1-to-1 and 1-to-2, but it could provide an incorrect response in the case of 2-to-2. This occurs because extra checking is required to determine whether or not the encoded sort order of the next input character matches that of the second character in the two-character pair which is stored in byte 23. As a result, encoding indicator 21 is enabled for the 2-to-2 situation (i.e. is "2") for characters which can potentially be the prefixes of the two-character pairs (e.g. "C" and "L" for Spanish). The actual encoded sort order for the second character of the two-character pair is stored in byte 24 which represents the highest encoded sort order value for that language (e.g. for the Spanish language it means the encoded value after the value for the letter "Z"). As usual, the encoded sort order for the character entry is still stored in byte 22. The actual values for the encoded sort orders for numerals and letters must be greater than those defined for the non-alphanumerical characters. If encoding indicator byte 21 is ignore (i.e. 255), then the character's encoding value can be ignored. This applies to control characters defined with code values Hex 00 to Hex 1F and Hex 80 to Hex 9F and non-alphanumerical characters Hex 21 to Hex 2F, Hex 3A to Hex 3F, Hex 40, Hex 5B to Hex 5F, Hex 60, Hex 7B to Hex 7F, and Hex A1 to Hex BF.

The accent priority encoding records 26 (FIG. 2A) are used to encode accents which are needed to support character priority. For those characters that can be accented (e.g. "A" and "E"), the first encoded accent value 27 is zero and the second encoded accent value 28 is unused since these characters require only 1-to-1 character encoding and this applies to accent encoding as well. The accent encoding values (27 and 28) start at 0 and go up based on the number of accents available. Note that the encoded accent values 27 and 28 are only significant in terms of sorting when the data is identical except for the accents.

For those characters that require 1-to-2 encoding, values 27 and 28 are used to store the encoded accent values of the two characters that are transliterated. The prefixes of the two-character pair (e.g. "C" and "L" for Spanish) are encoded the same way as other characters and no special accent encoding values are needed (i.e. they are encoded the same way as other 1-to-1 encoding characters). The accent values of those character-pairs that require 2-to-2 encoding depend on the transliterated characters (i.e. the largest sort order) which, however, do not embody accents and hence their encoded accent values are undefined.

The non-alphanumerical character encoding records 31 (FIG. 3A) are used to encode all other printable characters except numerals and letters. Those characters are assigned encoding values from 1 upward and are stored in encoded sort order 32. The last encoding value plus one in this category will be the starting value for the encoded sort orders used for the alphanumerical characters.

The overall sortkey encoding process 33 is depicted in FIG. 4. Data 34 (i.e. words) after being encoded by software 35, which uses language dependent data files 36 as encoding table, transforms data 34 into language dependent sortkeys 37. The sortkeys 37 can then be used for comparison during the actual sorting operation.

Figure 5:
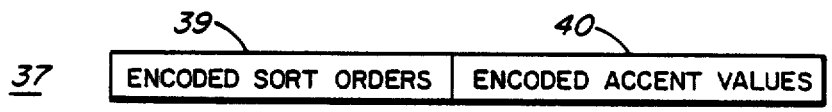
FIG. 5 is a simplified block diagram depicting the composition of a sortkey entry, encoded according to the present invention.

FIG. 5 depicts, in more detail, the structure of an encoded sortkey 37. The encoded sortkey 37 is longer than the original data due to the presence of the encoded accent priority values 40. Encoded sortkey 37 is comprised of encoded sort orders 39 and encoded accent values 40. The increase in the length of encoded sortkey 37 (over the length of the original data) can at most be one-half the size of the original data if all characters in the data have accent priority values This occurs because encoded accent priority values 40 are packed two values into one byte since the values range from 0 to 10; hence each value fits into 4 bits. Note that encoded accent priority values 40 are stored in the encoded sortkey 37 only for letters that can be accented (e.g. "A" and "E") or for actually accented letters (e.g. "Á" and "É"). This means that for data that contains only numerals, letters that cannot be accented (e.g. "X" and "Z") and non-alphanumerical characters, there will be no increment in the size of encoded sortkey 37 over that of the raw data.

Figure 6:
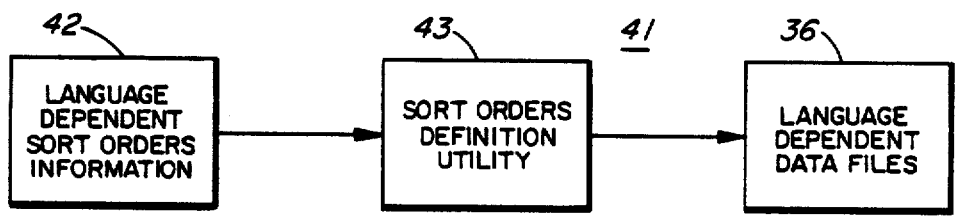
FIG. 6 is a simplified block diagram depicting how language dependent data files are created with an off-line utility which is used to translate sort orders into data files needed by the encoding software.
Figure 7:
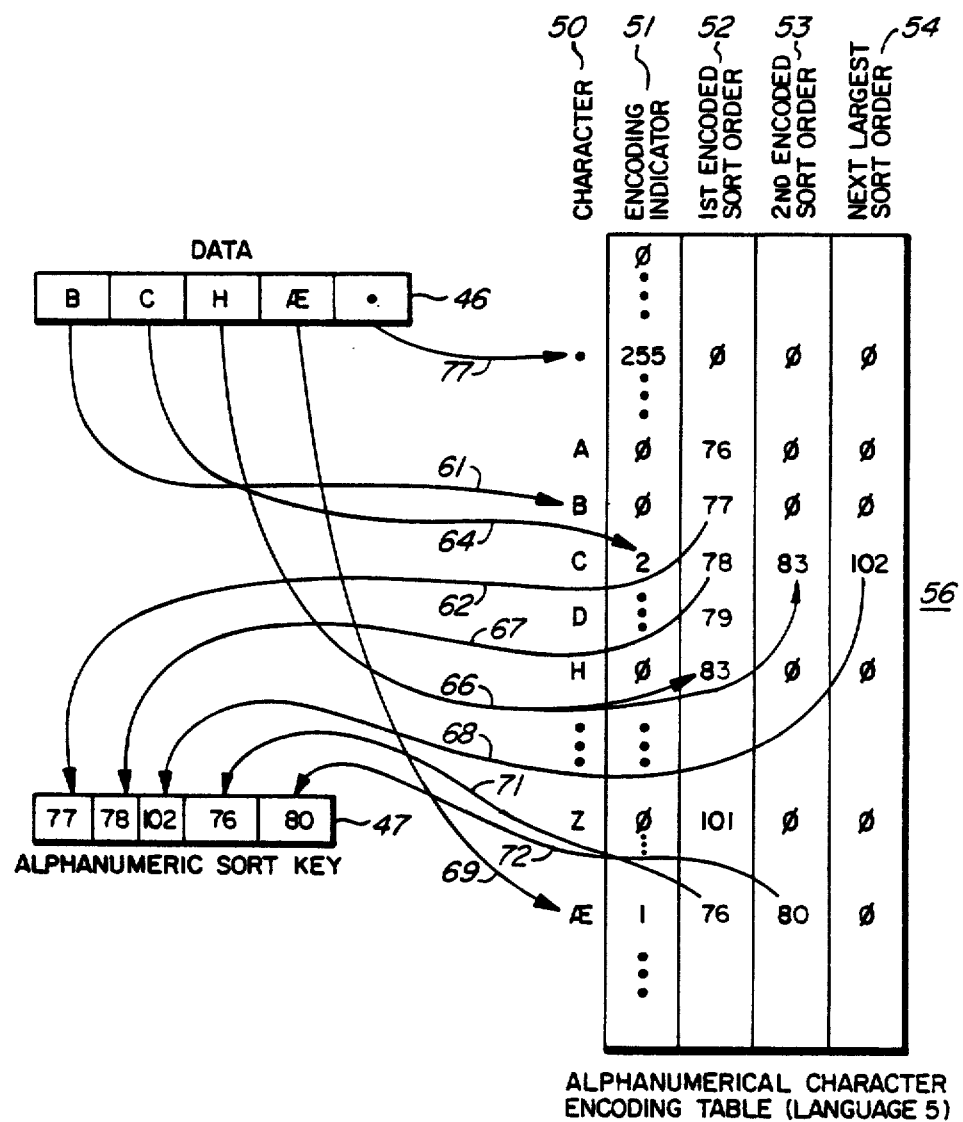
FIG. 7 is a simplified pictorial representation of the actual encoding step performed by the present invention on an illustrative alphabetical example.
Figure 8:
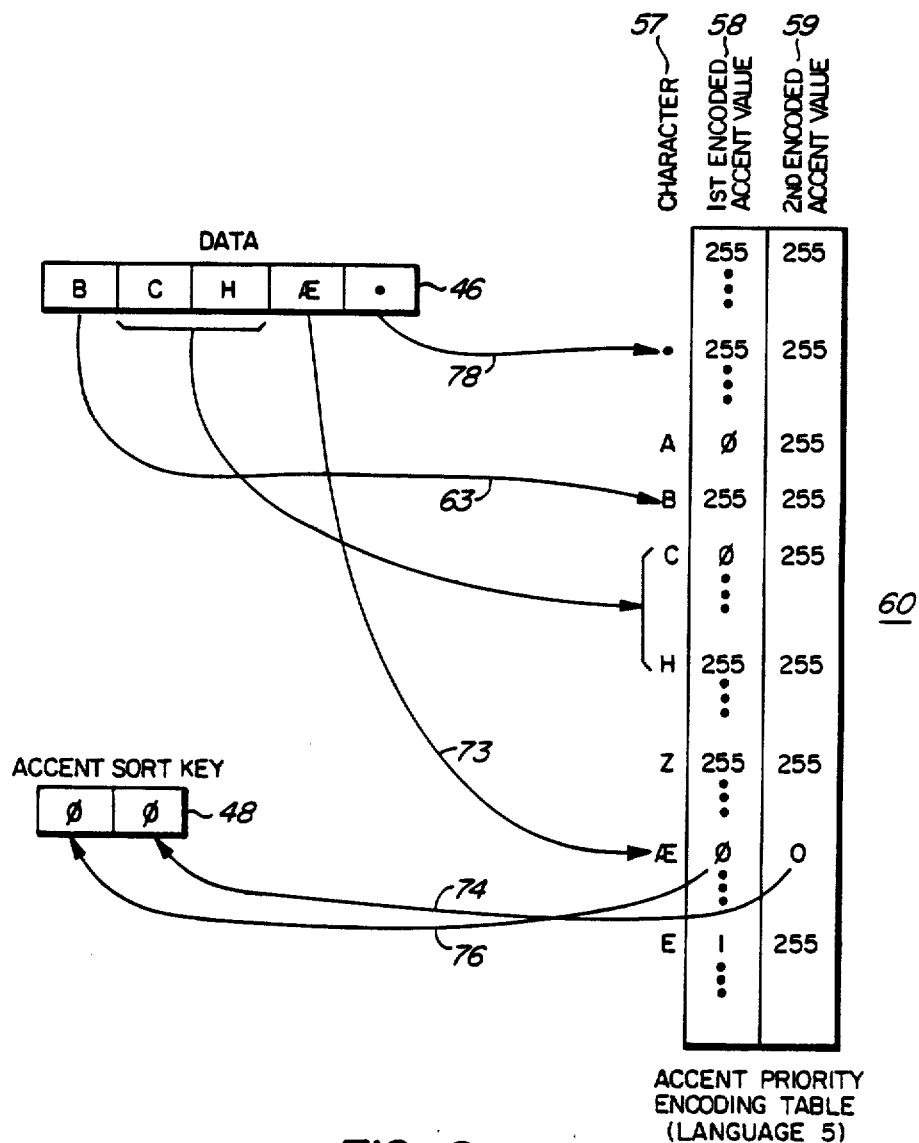
FIG. 8 is a simplified pictorial representation of the actual accent priority encoding step performed by the present invention on an illustrative example.
Figure 9:
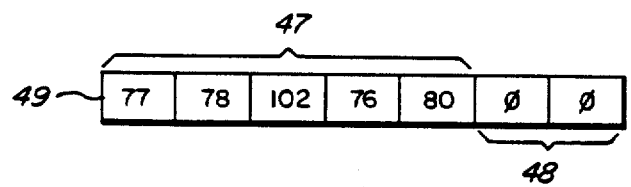
FIG. 9 is a simplified pictorial illustration of a complete data sortkey.

FIG. 6 is a simplified block diagram depicting the sort orders definition utility 41. The language dependent data files 36 needed by the overall sortkey encoding process 33 (FIG. 4) are created by an off-line data file construction process 41 (FIG. 6) which takes the sort order information 42 of each particular language and uses the sort orders definition utility 43 to build up the three encoding tables referred to as language dependent data files 36 (i.e. alphanumerical encoding table 120, FIG. 1B, accent priority encoding table 126, FIG. 2B, and non-alphanumerical character encoding table 131, FIG. 3B). The use of data files 36 separates the sorting software from the language dependency of the sort orders and allows the use of one set of sorting software FIGS. 7 and 8 are pictorial representations of the actual encoding of an arbitrary sample word or data "BCHÆ" shown at 46. The encoded version of the alphanumerical portion of this word is shown in encoded form in FIG. 7 as alphanumeric sortkey 47. The encoded version of the accent attribute portion of word 46 is shown in encoded form in FIG. 8 as accent sortkey 48. The complete encoded version of word 46, referred to as data sortkey 49, is shown in FIG. 9 and consists of alphanumeric sort key 47 followed by accent sortkey 48.

FIG. 7 illustrates the four possible actions that can occur in the alphanumerical encoding process: i.e. 1-to-1, 2-to-2, 1-to-2, and ignore. The example given is based on a language 5 (which might be Spanish) alphanumerical character encoding table and is given for illustrative purposes only.

The first step in the encoding process is to check the first character in word 46, i.e. the character "B" against its corresponding encoding indicator 51. This is indicated in FIG. 7 by line 61 extending from the character "B" in the word 46 to the B entry in character column 50 of Alphanumerical Character Encoding table 56 which has as a corresponding entry in encoding indicator column 51 the value "0" indicating that the encoding is 1-to-1. Hence, the corresponding encoded sort order (i.e. "77") is fetched from first encoded sort order column 52 and put into the first position of Alphanumeric sortkey 47 as indicated by the line 62.

The character "B" is checked again to see if any accent priority has to be stored (see FIG. 8). As indicated by line 63, in FIG. 8, extending from the character "B" in word 46 to the B entry in character column 57 of Accent Priority Encoding table 60 which has as a corresponding entry in first encoded accent value column 58 the value "255". The value "255" in column 58 indicates that this character cannot contain an accent and hence no value is needed to be stored in accent sortkey 48.

The same checking step against character column 50 of Alphanumerical Character Encoding table 56 (FIG. 7) is repeated for the next character in word 46, i.e. the letter "C", as indicated by line 64. The corresponding entry in encoding indicator column 51 is the value "2" which indicates that 2-to-2 encoding might be required. To determine whether or not this is indeed the case, the next letter in word 46, i.e. the letter "H" is encoded, as indicated by line 66 extending from the character "H" in word 46 to the H entry in character column 50 which has as a corresponding entry in first encoded sort order column 52 the value "83". This value is then compared against the one stored in second encoded sort order column 53, corresponding to the character "C" (which has the value "83"). Since the values are identical (both have the value "83"), this indicates that a character-pair is present (i.e. the characters "CH" must be treated as one unit and not as two separate characters: i.e. 2-to-2 encoding is required). The value "78" from first encoded sort order column 52, corresponding to the letter "C", is put into the second position of alphanumeric sortkey 47 as indicated by line 67. The next largest sort order column 54, corresponding to the character "C" (i.e. value "102") is put into the third position of sortkey 47 as indicated by line 68. No checking is needed for accent priorities as no accent is defined for the next largest sort order column 54 and the accent priority for the first character of the character-pair (i.e. C) can be ignored since it will never be used (note that this information can be extracted from encoding indicator 51 which has the value 2 in this instance).

If the encoded sort order of the character after "C" in the input data were not "83" as indicated by the entry in the second encoded sort order column 53 against the character "C" entry, then only the first encoded sort order of the character "C" (i.e. "78" as found in column 52) would be put into the second position of sortkey 47.

Next, the character 'Æ' is encoded, as indicated by line 69 between the character 'Æ' in word 46 and the entry 'Æ' in column 50 of encoding table 56. The entry in encoding indicator column 51 corresponding to the character "Æ" has the value "1". This indicates that the character requires 1-to-2 encoding. As a result, the values (encoded sort orders) from columns 52 and 53 (i.e. values "76" and "80" respectively) are placed into the next two positions of alphanumeric sortkey 47 as indicated by the lines 71 and 72.

As shown in FIG. 8, the character "Æ" is checked against Accent Priority Encoding Table 60 as indicated by line 73. This action reveals that the character "Æ" has two accent attributes and hence the two encoded accent values, each of which is "0", are fetched and put into accent sortkey 48 as indicated by lines 74 and 76.

The final character in word 46 is a period(.). It is checked against encoding table 56 (FIG. 7) as indicated by line 77. The entry in column 51 against the character "." is the value "255" which indicates that no encoding value is needed and that therefore this is an ignore situation. This value is therefore not added to alphanumeric sortkey 47. The same thing occurs in FIG. 8 when the accent priority is checked, as indicated by line 78.

FIG. 9 depicts the complete data sortkey 49 for the original word 46. Data sortkey 49 comprises alphanumeric sortkey 47 followed by accent sortkey 48 (depicted before packing two bytes into one) as shown in the Figure.

Figure 10:
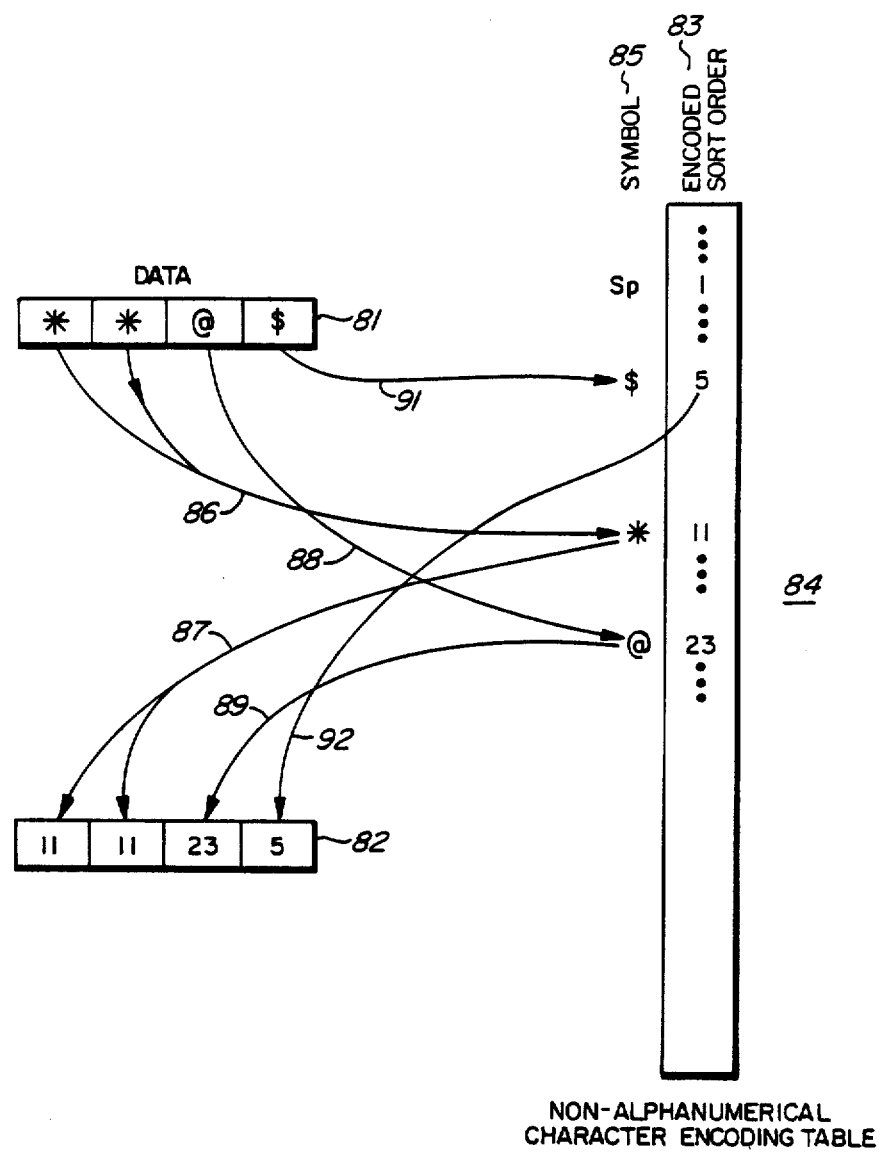
FIG. 10 is a simplified pictorial representation of the actual encoding steps performed by the present invention on an illustrative non-alphanumerical example.
Figure 12:
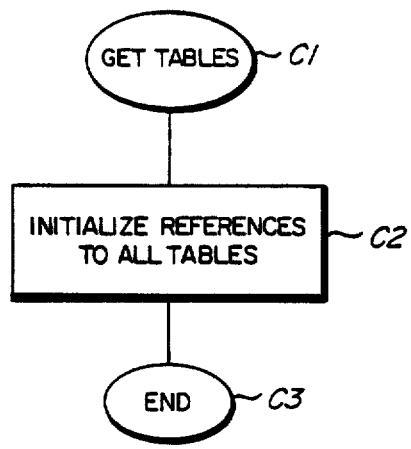
FIGS. 12, 13, 14A and 14B are simplified flow charts useful for understanding the present invention.
Figure 13:
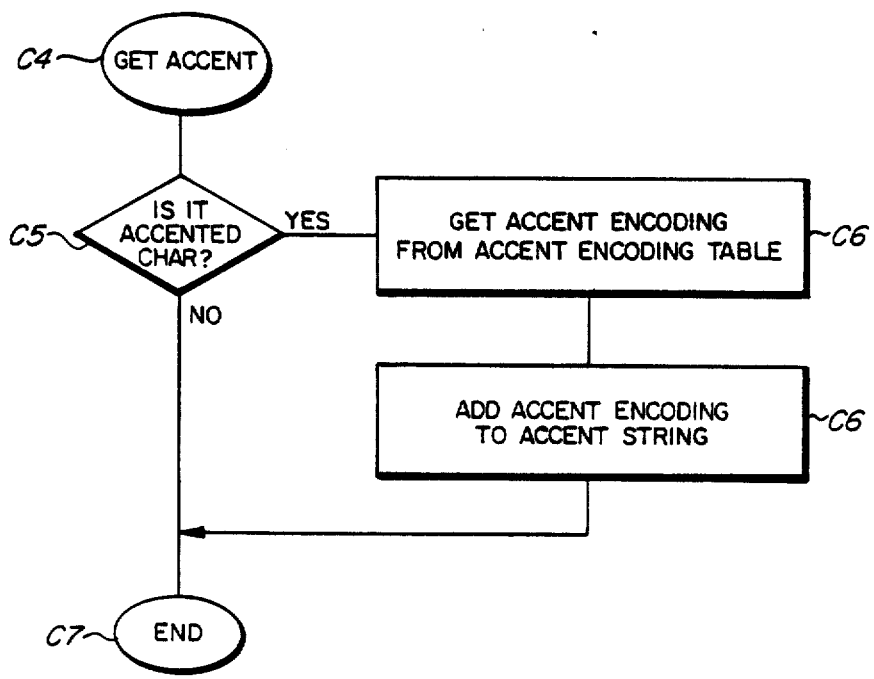
Figure 14A:
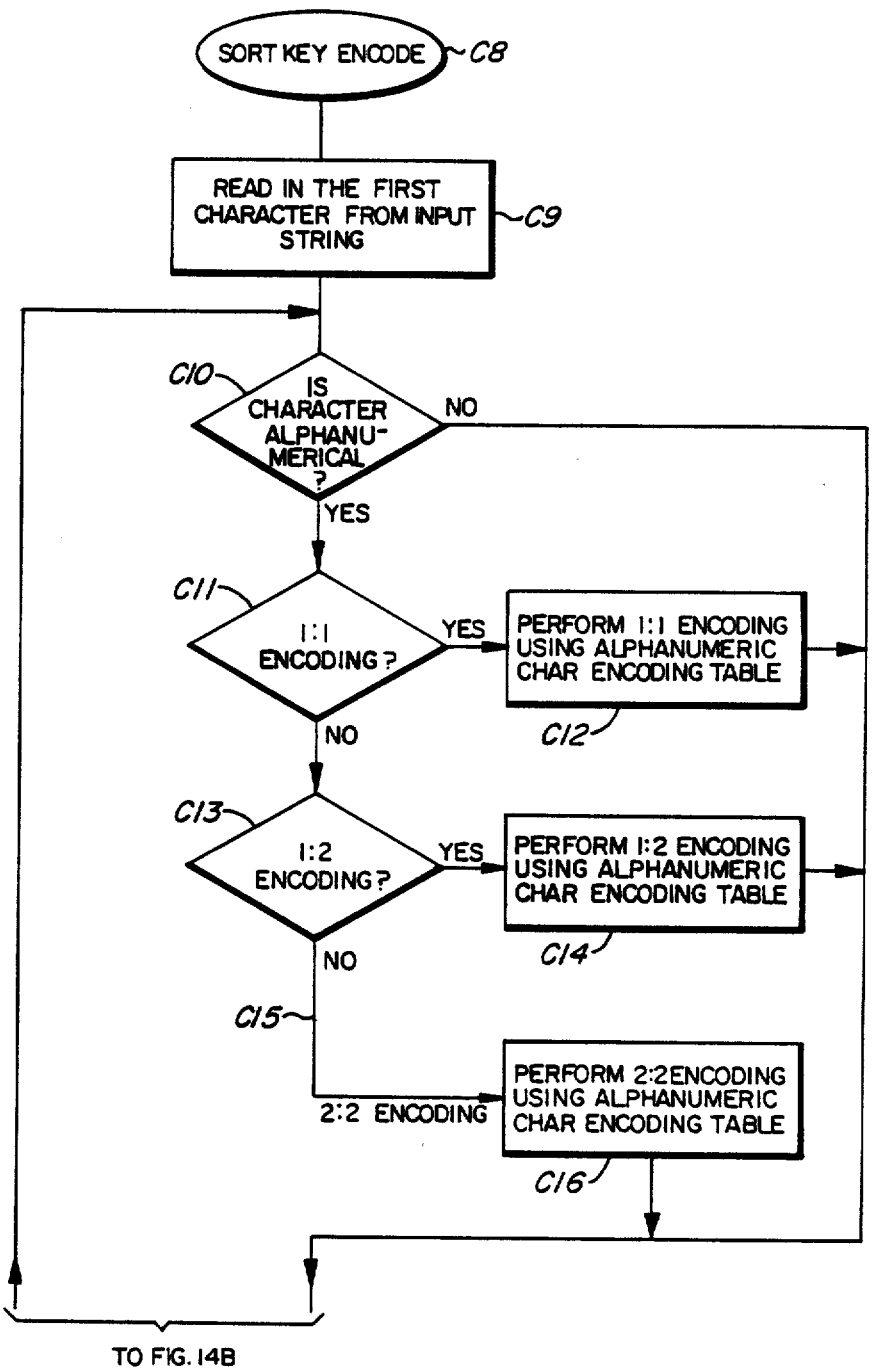
Figure 14B:
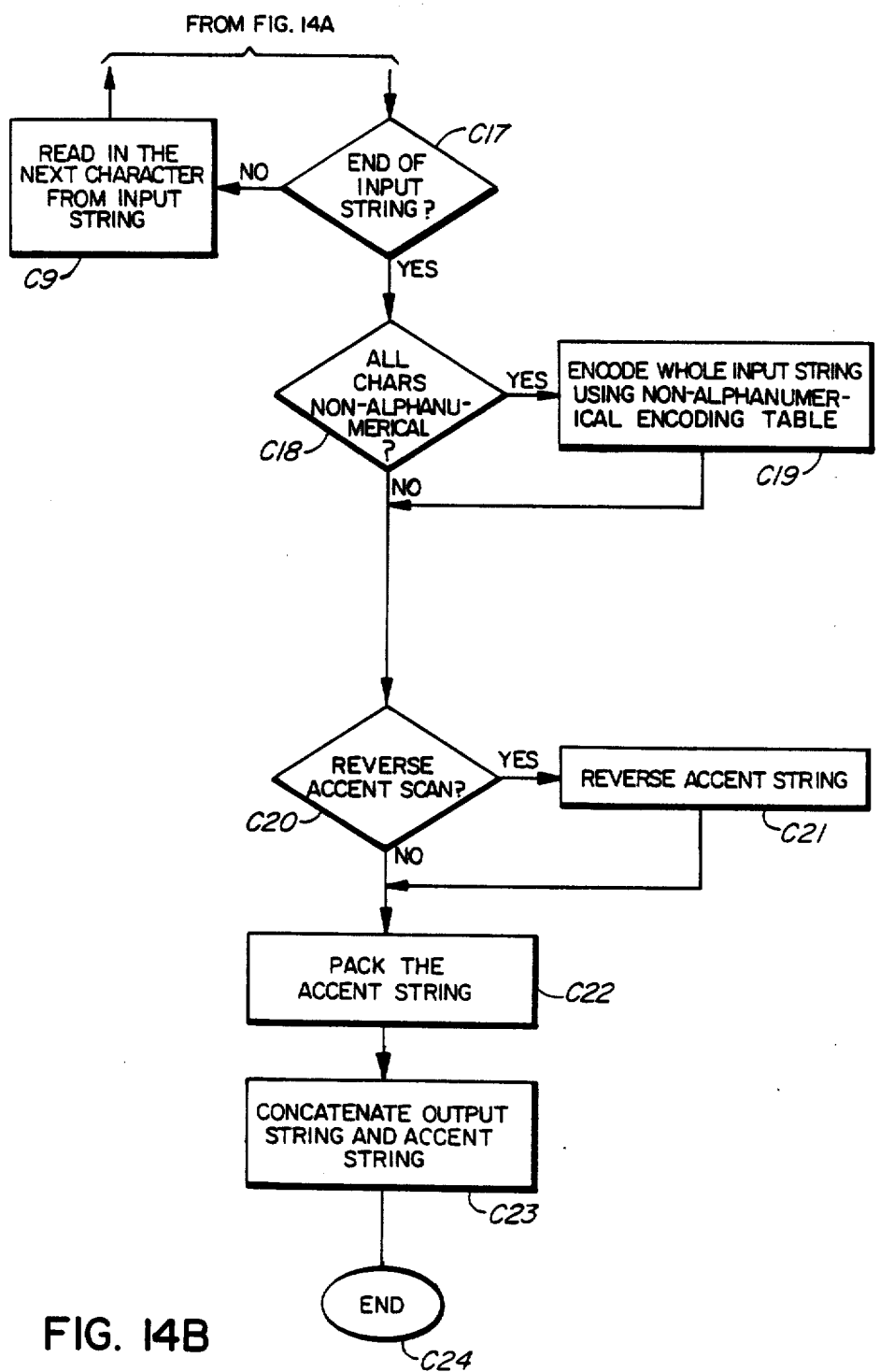

FIG. 10 illustrates the invention for the situation when data 81 contains only non-alphanumerical characters. Each character is encoded using the Non-alphanumerical Character Encoding table 84. The first symbol in data 81, i.e. asterisk * is checked against the asterisk * in symbol column 85 of Non-Alphanumerical Character Encoding table 84. This is indicated by line 86; the corresponding entry in encoded sort order column 83 of table 84 is the number "11". This number is then placed in the first position of sortkey 82 as indicated by line 87. The same steps apply for the second asterisk in data 81.

Similar steps apply for the symbol @; the symbol @ in data 81 is checked against the symbol @ in symbol column 85 of table 84 as indicated by line 88. The corresponding entry in encoded sort order column 83 of table 84 is the number "23". This number is then placed in the third position of sortkey 82 as indicated by line 89.

Finally, the same steps are applied to the final symbol of data 81, namely the symbol $. The symbol $ in data 81 is checked against the symbol $ in symbol column 85 of table 84 as indicated by line 91. The corresponding entry in encoded sort order column 83 of table 84 is the number "5". This number is then placed in the final position of sortkey 82 as indicated by line 92.

As can be seen from the foregoing, the encoding process is relatively simple and flexible once the language dependent data files 36 are set up. In addition, the encoding process 33 will not introduce major overhead to the current sorting process or logic. The encoding simply replaces the current case conversion which is performed prior to comparison of two strings during the sorting process. Notice that the encoding process 33 includes case conversion as well since sorting is supposed to be case insensitive.

To give an even better understanding of the advantages and details of the sorting methods described in the previous sections, the contents of the three encoding tables (56, 60, and 84), and the transliteration process involved in the encoding operation is described below in more detail.

For the illustrative embodiments described, the distribution of the encoded sort order values for different characters is depicted below:

(1) value 1 to value 65 for non-alphanumerical characters.
(2) value 66 to value 75 for digits.
(3) value 76 and up for letters defined in the language and transliterated foreign letters.
(4) value 0 for characters that can have but do not have accents.
(5) the values for accents are as follows:

| value | accent | example |
|-------|--------|---------|
| 1 | acute | á |
| 2 | grave | à |
| 3 | circumflex | â |
| 4 | tilde | ã |
| 5 | umlaut | ä |
| 6 | ring | å |
| 7 | cedilla | Ç |
| 8 | hyphen | Ð |
| 9 | slash | Ø |
| 10 | other accents | Þ |
| 255 | no accent | β |

(6) 0, 1 and 2 indicate respectively 1-to-1, 1-to-2 and 2-to-2 encoding.

(7) Ignore is given the value 255 or 0.

More complete contents of the Alphanumerical Character Encoding Table 156, for language 5, which might be the Spanish language, are shown in Appendix E.

More complete contents of the Accent Priority Encoding Table 160, for languages 1 and 5, are shown in Appendix F.

More complete contents of the Non-Alphanumerical Character Encoding Table 184, for languages 1 and 5, are shown in Appendix G.

The contents of the Alphanumeric Character Encoding Table for language 1, which might be the English language, are shown in Appendix D.

One of the advantages of the sorting method of the present invention is the capacity to sort foreign letters. However, since sort orders are only defined for letters within the language's alphabet, a special method called "transliteration" is used to transliterate foreign letters. Examples of the transliteration process of foreign characters for several languages are shown in Appendix C. The concept behind the transliteration process is very simple: characters that do not appear in a language are collated where users of that language might be expected to look for them and in most cases the grouping is based on geometrical similarity.

In somewhat more detail, all the characters defined in ISO 8859/1 will be assigned sort orders even if they do not belong to the user's language. The characters outside the user's language will be sorted according to the following general rules:

(a) Geometrical similarity—some foreign characters may resemble a national character and as a result, they may be sorted together (e.g. Ä would become A in English).

(b) Phonetic similarity—some foreign letters may sound identical or similar to a national letter (even though they look different) and then they may be sorted together (e.g. Æ would become Ä in Swedish; β would become ss in English).

The concept used in transliteration is incorporated into the encoding tables when language dependent data files are created. This means the proposed sorting methods include techniques for sortkey encoding as well as transliteration of foreign letters. Refer to Appendix C for the relationship between different languages.

Pseudo-Code

Simplified pseudo-code useful for understanding the implementation of the present invention is included in Appendix A to which attention is hereby directed.

It is believed that the pseudo-code of Appendix A is self-explanatory, but in order to ensure a complete disclosure, flowcharts (FIGS. 12, 13, 14A and 14B) have been included to describe the operations performed by the pseudo-code.

The sections of the pseudo-code of Appendix A are cross-referenced to the corresponding sections of the flow charts of FIGS. 12, 13, 14A and 14B by the reference characters starting with the letter C.

A Glossary of terms used in this document can be found in Appendix B, to which attention is directed.

APPENDIX A

Pseudo-Code (simplified)

```
{------------------------------------------------------------
+                                                            +
+Data Structure Declaration                                  +
+                                                            +
+CharPtr     *:Pointer to alphanumerical char encoding table  -
+AccentPtr    :Pointer to accent priority encoding table      -
+NonAlphaPtr :Pointer to non-alphanumerical char encoding table+
+p_Direction :Pointer to accent scan direction                -
+------------------------------------------------------------}
TYPE language    =  (English, Dutch, Danish, Faeroese, German,
                   Finnish, French, Portuguese, Irish,
                   Swedish, Spanish, Icelandic, Italian,
                   Norwegian);
   NonTable    =  PACKED ARRAY [0..255] OF CHAR;
   CharRec     =  PACKED ARRAY [0..3] OF CHAR;
   ChRecTab    =  PACKED ARRAY[0..255] OF CharRec;
   AccentRec   =  PACKED ARRAY[0..1]OF CHAR;
   AcRecTab    =  PACKED ARRAY[0..255]OF AccentRec;
   t_Direction =  (forward, reverse);

CharTable     =  ^ChRecTab;
   AccentTable   =  ^AcRecTab;
   NonAlphaTable =  ^NonTable;
   p_Direction   =  ^t_Direction;

VAR
   CharPtr      :  CharTable;
   AccentPtr    :  AccentTable;
   NonAlphaPtr  :  NonAlphaTable;
   direction    :  p_Direction;

{------------------------------------------------------------+
+                                                            +
+ This function gets the user's language and reads in the    +
+ corresponding data file and sets up the three internal     +
+ encoding tables through "CharPtr", "AccentPtr" and         +
+ "NonAlphaPtr".                                             +
+                                                            +
+-----------------------------------------------------------}
FUNCTION Get_Tables (language      :  t_language;
                     VAR CharPtr   :  CharTable;
   C1                VAR AccentPtr :  AccentTable;
                     VAR NonAlphaPtr : NonAlphaTable;
                     VAR direction :  p_Direction;
                    ): INTEGER;
```

BEGIN

Initialize CharPtr, AccentPts, NonAlphaPtr and direction
for the language indicated by the variable language.  ~C2

END;~
   C3

```
{----------------------------------------------------------+
+                       *.                      .          +
+ This procedure encodes "Instr" to the corresponding      +
+ language dependent sortkey "Outstr" based on the data    +
+ referenced by the three pointers                         +
+                                                          +
+ The sub-procedure Get_Accent packs the encoded accent    +
+ values into a temporary string "AccentStr" which is      +
+ later appended to the end of "Outstr".                   +
+                                                          +
+----------------------------------------------------------}

PROCEDURE SortKey_Encode(Instr      : STRING;
                         VAR Outstr : STRING;
                         CharPtr    : CharTable;
                         AccentPtr  : AccentTable;
                         NonAlphaPtr: NonAlphaTable);

VAR
   i
   index_in,
   index_out,
   acc_index  : INTEGER;
   temp       : CHAR;
   accentstr  : STRING;

{----------------------------------------------------------+
+                                                          +
+ MainIndex--index into the 256 entries (accent encoding table) +
+ SubIndex --index into accent/priority encoding record    +
+ AccentStr--temporary string to store the encoded accent values+
+                                                          +
+----------------------------------------------------------}

PROCEDURE Get_Accent(MainIndex      : INTEGER;
                     SubIndex       : INTEGER
     C4              VAR Acc_Index  : INTEGER;
                     VAR AccentStr  : STRING);

BEGIN

{ check to see if the character has accent value }
   IF AccentPtr ^[MainIndex][SubIndex] <> CHR(255) THEN ~C5
   BEGIN
      Acc_Index := Acc_Index + 1;
      AccentStr[Acc_index] := AccentPtr^[MainIndex][SubIndex]; ~C6
   END;

END;   { Get_Accent }
    \
     C7
```

```
       C8
      /
BEGIN  { SortKey_Encode }
   index_in  := 0;
   index_out := 0;
   acc_index := 0;

REPEAT index_in:= index_in +1;        C9
                                /
  CASE CharPtr  ^[ORD(Inst[index_in])][0] OF '255' : BEGIN
       \      { no encoding value for this character }
       C10    END;

'0'  : BEGIN ( 1-to-1 encoding )                                    C12
        /       index_out:= index_out + 1;                           /
     C11        Outstr[index_out]:= CharPtr ^[ORD(Instr[index_in])][1];
                Get_Accent(ORD(Instr[index_in]), 0, acc_index,accent_str);
                END;

'1' : BEGIN ( 1-to-2 encoding )
       /       index_out:= index_out + 1;
     C13       Outstr[index_out]:= CharPtr ^[ORd(Instr[index_in])][1];
               Get_Accent(ORD(Instr[index_in]), 0, acc_index,accentstr);
               index_out:= index_out + 1;
               Outstr[index_out]:=CharPtr^[ORD(Instr[index_in])][2];
               Get_Accent(ORD(Inst[index_in]), 1, acc_index, accentstr);
               END
                                                                   C14
  '2' : BEGIN ( 2-to-2 encoding )
       \       temp:= CharPtr ^[ORD(Instr[index_in+1])][1];
      C15      IF temp = CharPtr^[ORD(Instr[index_in])][2] THEN
               BEGIN
                  index_out:= index_out + 1;
                  Outstr[index_out]:=CharPtr^[ORD(Instr[index_in])][1];
                  index_out: = index_out + 1;
                  Outstr[index_out]:=CharPtr ^[ORD(Instr[index_in])][3];
                  index_in:= index_in + 1:
               END ELSE                                             C16
               BEGIN
               index_out:= index_out + 1;
               Outstr[index_out]:=CharPtr^[ORD(Inst[index_in])][1];
               Get_Accent(ORD(Inst[index_in]), 0, acc_index,accentstr);
               END;
               END;

END; ( case )

UNTIL index_in = LENGTH(Instr);
                /
              C17

{ Instr does not contain digits or letters when index_out = 0 }
{ So use Non-Alphanumerical Character Encoding Table }
         C18
IF index_out = 0 THEN
BEGIN       *
   FOR i:= 1 TO LENGTH(Instr) DO            C19
     Outstr[i]:= NonAlphaPtr  ^[ORD(Instr[i])];
END ELSE BEGIN
```

```
(reverse direction of accent string if needed)
IF direction = reverse THEN BEGIN    C20
    FOR i:=1 TO LENGTH(InStr) DO
        TempStr[LENGTH(InStr)-i-1] := AccentStr[i];   C21
    AccentStr := TempStr;
END;

{ pack encoded accent values 2 bytes into 1 since the largest}
{ value is 10 (can fit in 4 bits).  }
                                                              C22

Outstr:= CONCAT(Outstr, AccentStr);   C23
  END;
END; { SortKey_Encode }
    C24
```

APPENDIX B

Glossary

| | |
|---|---|
| Sorting | The word "Sorting" used in this document in general refers primarily to the alphabetical dictionary ordering of characters. The mechanism addresses sort orders or digits, letters and non-alphanumerical characters, transliteration of foreign letters and accent priority. |
| Sorting Encoding | An encoding scheme which is aimed primarily to deal with "Sorting". The operation is to encode the words to a standard form ready for sorting with ordinary sorting algorithms. |
| National Characters | Characters that are included in one's language. |
| Foreign Characters | Characters that are not included in one's language. |
| Accent Priority | Priority is assigned to accents when the words being compared differ only by accent. |
| Transliteration | The operation of representing the characters of one alphabet by those of another. |
| Character | A generic term used to refer to a letter, a numeral, a non-alphanumerical character, or any combination of the preceding. |
| Multilingual Alphabet | An alphabet formed by the union of foreign and national characters. |

APPENDIX C

| Latin Character | Language 1 Equivalent | Language 2 Equivalent | Language 3 Equivalent | Language 4 Equivalent |
|---|---|---|---|---|
| À,à | A,a | A,a | A,a | À,à |
| Á,á | A,a | A,a | A,a | A,a |
| Â,â | A,a | A,a | A,a | Â,â |
| Ã,ã | A,a | A,a | A,a | A,a |
| Ä,ä | A,a | Ä,ä | Ä,ä | A,a |
| Å,å | A,a | A,å | A,a | A,a |
| Æ,æ | AE,ae | Ä,ä | AE,ae | AE,ae |
| Ç,ç | C,c | C,c | C,c | Ç,ç |
| È,è | E,e | E,e | E,e | È,è |
| É,é | E,e | É,é | E,e | É,é |
| Ê,ê | E,e | E,e | E,e | Ê,ê |
| Ë,ë | E,e | E,e | E,e | Ë,ë |
| Ì,ì | I,i | I,i | I,i | I,i |
| Í,í | I,i | I,i | I,i | I,i |
| Î,î | I,i | I,i | I,i | Î,î |
| Ï,ï | I,i | I,i | I,i | Ï,ï |
| Ð,đ | D,d | D,d | D,d | D,d |
| Ñ,ñ | N,n | N,n | N,n | N,n |
| Ò,ò | O,o | O,o | O,o | O,o |
| Ó,ó | O,o | O,o | O,o | O,o |
| Ô,ô | O,o | O,o | O,o | Ô,ô |
| Õ,õ | O,o | O,o | O,o | O,o |
| Ö,ö | O,o | Ö,ö | Ö,ö | O,o |
| Ø,ø | O,o | Ö,ö | O,o | O,o |
| Ù,ù | U,u | U,u | U,u | Ù,ù |
| Ú,ú | U,u | U,u | U,u | U,u |
| Û,û | U,u | U,u | U,u | Û,û |
| Ü,ü | U,u | Ü,ü | Ü,ü | Ü,ü |
| Ý,ý | Y,y | Y,y | Y,y | Y,y |
| Þ,þ | P,p | P,p | P,p | P,p |
| ß | ss | ss | β | ss |
| ÿ | y | y | y | y |

| Alphanumerical Character Encoding Table (Language 1) | | | | | | | | | | | | | | | |
|---|---|---|---|---|---|---|---|---|---|---|---|---|---|---|---|
| 0 | 255 | 0 | 0 | 0 | 41 | 255 | 0 | 0 | 0 | 82 | 0 | 93 | 0 | 0 |
| 1 | 255 | 0 | 0 | 0 | 42 | 255 | 0 | 0 | 0 | 83 | 0 | 94 | 0 | 0 |
| 2 | 255 | 0 | 0 | 0 | 43 | 255 | 0 | 0 | 0 | 84 | 0 | 95 | 0 | 0 |
| 3 | 255 | 0 | 0 | 0 | 44 | 255 | 0 | 0 | 0 | 85 | 0 | 96 | 0 | 0 |
| 4 | 255 | 0 | 0 | 0 | 45 | 255 | 0 | 0 | 0 | 86 | 0 | 97 | 0 | 0 |
| 5 | 255 | 0 | 0 | 0 | 46 | 255 | 0 | 0 | 0 | 87 | 0 | 98 | 0 | 0 |
| 6 | 255 | 0 | 0 | 0 | 47 | 255 | 0 | 0 | 0 | 88 | 0 | 99 | 0 | 0 |
| 7 | 255 | 0 | 0 | 0 | 48 | 0 | 66 | 0 | 0 | 89 | 0 | 100 | 0 | 0 |
| 8 | 255 | 0 | 0 | 0 | 49 | 0 | 67 | 0 | 0 | 90 | 0 | 101 | 0 | 0 |
| 9 | 255 | 0 | 0 | 0 | 50 | 0 | 68 | 0 | 0 | 91 | 255 | 0 | 0 | 0 |
| 10 | 255 | 0 | 0 | 0 | 51 | 0 | 69 | 0 | 0 | 92 | 255 | 0 | 0 | 0 |
| 11 | 255 | 0 | 0 | 0 | 52 | 0 | 70 | 0 | 0 | 93 | 255 | 0 | 0 | 0 |
| 12 | 255 | 0 | 0 | 0 | 53 | 0 | 71 | 0 | 0 | 94 | 255 | 0 | 0 | 0 |
| 13 | 255 | 0 | 0 | 0 | 54 | 0 | 72 | 0 | 0 | 95 | 255 | 0 | 0 | 0 |
| 14 | 255 | 0 | 0 | 0 | 55 | 0 | 73 | 0 | 0 | 96 | 255 | 0 | 0 | 0 |
| 15 | 255 | 0 | 0 | 0 | 56 | 0 | 74 | 0 | 0 | 97 | 0 | 76 | 0 | 0 |
| 16 | 255 | 0 | 0 | 0 | 57 | 0 | 75 | 0 | 0 | 98 | 0 | 77 | 0 | 0 |
| 17 | 255 | 0 | 0 | 0 | 58 | 255 | 0 | 0 | 0 | 99 | 0 | 78 | 0 | 0 |
| 18 | 255 | 0 | 0 | 0 | 59 | 255 | 0 | 0 | 0 | 100 | 0 | 79 | 0 | 0 |
| 19 | 255 | 0 | 0 | 0 | 60 | 255 | 0 | 0 | 0 | 101 | 0 | 80 | 0 | 0 |
| 20 | 255 | 0 | 0 | 0 | 61 | 255 | 0 | 0 | 0 | 102 | 0 | 81 | 0 | 0 |
| 21 | 255 | 0 | 0 | 0 | 62 | 255 | 0 | 0 | 0 | 103 | 0 | 82 | 0 | 0 |
| 22 | 255 | 0 | 0 | 0 | 63 | 255 | 0 | 0 | 0 | 104 | 0 | 83 | 0 | 0 |

-continued

| Alphanumerical Character Encoding Table (Language 1) | | | | | | | | | | | | | | |
|---|---|---|---|---|---|---|---|---|---|---|---|---|---|---|
| 23 | 255 | 0 | 0 | 0 | 64 | 255 | 0 | 0 | 0 | 105 | 0 | 84 | 0 | 0 |
| 24 | 255 | 0 | 0 | 0 | 65 | 0 | 76 | 0 | 0 | 106 | 0 | 85 | 0 | 0 |
| 25 | 255 | 0 | 0 | 0 | 66 | 0 | 77 | 0 | 0 | 107 | 0 | 86 | 0 | 0 |
| 26 | 255 | 0 | 0 | 0 | 67 | 0 | 78 | 0 | 0 | 108 | 0 | 87 | 0 | 0 |
| 27 | 255 | 0 | 0 | 0 | 68 | 0 | 79 | 0 | 0 | 109 | 0 | 88 | 0 | 0 |
| 28 | 255 | 0 | 0 | 0 | 69 | 0 | 80 | 0 | 0 | 110 | 0 | 89 | 0 | 0 |
| 29 | 255 | 0 | 0 | 0 | 70 | 0 | 81 | 0 | 0 | 111 | 0 | 90 | 0 | 0 |
| 30 | 255 | 0 | 0 | 0 | 71 | 0 | 82 | 0 | 0 | 112 | 0 | 91 | 0 | 0 |
| 31 | 255 | 0 | 0 | 0 | 72 | 0 | 83 | 0 | 0 | 113 | 0 | 92 | 0 | 0 |
| 32 | 0 | 1 | 0 | 0 | 73 | 0 | 84 | 0 | 0 | 114 | 0 | 93 | 0 | 0 |
| 33 | 255 | 0 | 0 | 0 | 74 | 0 | 85 | 0 | 0 | 115 | 0 | 94 | 0 | 0 |
| 34 | 255 | 0 | 0 | 0 | 75 | 0 | 86 | 0 | 0 | 116 | 0 | 95 | 0 | 0 |
| 35 | 255 | 0 | 0 | 0 | 76 | 0 | 87 | 0 | 0 | 117 | 0 | 96 | 0 | 0 |
| 36 | 255 | 0 | 0 | 0 | 77 | 0 | 88 | 0 | 0 | 118 | 0 | 97 | 0 | 0 |
| 37 | 255 | 0 | 0 | 0 | 78 | 0 | 89 | 0 | 0 | 119 | 0 | 98 | 0 | 0 |
| 38 | 255 | 0 | 0 | 0 | 79 | 0 | 90 | 0 | 0 | 120 | 0 | 99 | 0 | 0 |
| 39 | 255 | 0 | 0 | 0 | 80 | 0 | 91 | 0 | 0 | 121 | 0 | 100 | 0 | 0 |
| 40 | 255 | 0 | 0 | 0 | 81 | 0 | 92 | 0 | 0 | 122 | 0 | 101 | 0 | 0 |
| 123 | 255 | 0 | 0 | 0 | 168 | 255 | 0 | 0 | 0 | 213 | 0 | 90 | 0 | 0 |
| 124 | 255 | 0 | 0 | 0 | 169 | 255 | 0 | 0 | 0 | 214 | 0 | 90 | 0 | 0 |
| 125 | 255 | 0 | 0 | 0 | 170 | 255 | 0 | 0 | 0 | 215 | 255 | 0 | 0 | 0 |
| 126 | 255 | 0 | 0 | 0 | 171 | 255 | 0 | 0 | 0 | 216 | 0 | 90 | 0 | 0 |
| 127 | 255 | 0 | 0 | 0 | 172 | 255 | 0 | 0 | 0 | 217 | 0 | 96 | 0 | 0 |
| 128 | 255 | 0 | 0 | 0 | 173 | 255 | 0 | 0 | 0 | 218 | 0 | 96 | 0 | 0 |
| 129 | 255 | 0 | 0 | 0 | 174 | 255 | 0 | 0 | 0 | 219 | 0 | 96 | 0 | 0 |
| 130 | 255 | 0 | 0 | 0 | 175 | 255 | 0 | 0 | 0 | 220 | 0 | 96 | 0 | 0 |
| 131 | 255 | 0 | 0 | 0 | 176 | 255 | 0 | 0 | 0 | 221 | 0 | 100 | 0 | 0 |
| 132 | 255 | 0 | 0 | 0 | 177 | 255 | 0 | 0 | 0 | 222 | 0 | 91 | 0 | 0 |
| 133 | 255 | 0 | 0 | 0 | 178 | 255 | 0 | 0 | 0 | 223 | 1 | 94 | 94 | 0 |
| 134 | 255 | 0 | 0 | 0 | 179 | 255 | 0 | 0 | 0 | 224 | 0 | 76 | 0 | 0 |
| 135 | 255 | 0 | 0 | 0 | 180 | 255 | 0 | 0 | 0 | 225 | 0 | 76 | 0 | 0 |
| 136 | 255 | 0 | 0 | 0 | 181 | 255 | 0 | 0 | 0 | 226 | 0 | 76 | 0 | 0 |
| 137 | 255 | 0 | 0 | 0 | 182 | 255 | 0 | 0 | 0 | 227 | 0 | 76 | 0 | 0 |
| 138 | 255 | 0 | 0 | 0 | 183 | 255 | 0 | 0 | 0 | 228 | 0 | 76 | 0 | 0 |
| 139 | 255 | 0 | 0 | 0 | 184 | 255 | 0 | 0 | 0 | 229 | 0 | 76 | 0 | 0 |
| 140 | 255 | 0 | 0 | 0 | 185 | 255 | 0 | 0 | 0 | 230 | 1 | 76 | 80 | 0 |
| 141 | 255 | 0 | 0 | 0 | 186 | 255 | 0 | 0 | 0 | 231 | 0 | 78 | 0 | 0 |
| 142 | 255 | 0 | 0 | 0 | 187 | 255 | 0 | 0 | 0 | 232 | 0 | 80 | 0 | 0 |
| 143 | 255 | 0 | 0 | 0 | 188 | 255 | 0 | 0. | 0 | 233 | 0 | 80 | 0 | 0 |
| 144 | 255 | 0 | 0 | 0 | 189 | 255 | 0 | 0 | 0 | 234 | 0 | 80 | 0 | 0 |
| 145 | 255 | 0 | 0 | 0 | 190 | 255 | 0 | 0 | 0 | 235 | 0 | 80 | 0 | 0 |
| 146 | 255 | 0 | 0 | 0 | 191 | 255 | 0 | 0 | 0 | 236 | 0 | 84 | 0 | 0 |
| 147 | 255 | 0 | 0 | 0 | 192 | 0 | 76 | 0 | 0 | 237 | 0 | 84 | 0 | 0 |
| 148 | 255 | 0 | 0 | 0 | 193 | 0 | 76 | 0 | 0 | 238 | 0 | 84 | 0 | 0 |
| 149 | 255 | 0 | 0 | 0 | 194 | 0 | 76 | 0 | 0 | 239 | 0 | 84 | 0 | 0 |
| 150 | 255 | 0 | 0 | 0 | 195 | 0 | 76 | 0 | 0 | 240 | 0 | 79 | 0 | 0 |
| 151 | 255 | 0 | 0 | 0 | 196 | 0 | 76 | 0 | 0 | 241 | 0 | 89 | 0 | 0 |
| 152 | 255 | 0 | 0 | 0 | 197 | 0 | 76 | 0 | 0 | 242 | 0 | 90 | 0 | 0 |
| 153 | 255 | 0 | 0 | 0 | 198 | 1 | 76 | 80 | 0 | 243 | 0 | 90 | 0 | 0 |
| 154 | 255 | 0 | 0 | 0 | 199 | 0 | 78 | 0 | 0 | 244 | 0 | 90 | 0 | 0 |
| 155 | 255 | 0 | 0 | 0 | 200 | 0 | 80 | 0 | 0 | 245 | 0 | 90 | 0 | 0 |
| 156 | 255 | 0 | 0 | 0 | 201 | 0 | 80 | 0 | 0 | 246 | 0 | 90 | 0 | 0 |
| 157 | 255 | 0 | 0 | 0 | 202 | 0 | 80 | 0 | 0 | 247 | 255 | 0 | 0 | 0 |
| 158 | 255 | 0 | 0 | 0 | 203 | 0 | 80 | 0 | 0 | 248 | 0 | 90 | 0 | 0 |
| 159 | 255 | 0 | 0 | 0 | 204 | 0 | 84 | 0 | 0 | 249 | 0 | 96 | 0 | 0 |
| 160 | 0 | 1 | 0 | 0 | 205 | 0 | 84 | 0 | 0 | 250 | 0 | 96 | 0 | 0 |
| 161 | 255 | 0 | 0 | 0 | 206 | 0 | 84 | 0 | 0 | 251 | 0 | 96 | 0 | 0 |
| 162 | 255 | 0 | 0 | 0 | 207 | 0 | 84 | 0 | 0 | 252 | 0 | 96 | 0 | 0 |
| 163 | 255 | 0 | 0 | 0 | 208 | 0 | 79 | 0 | 0 | 253 | 0 | 100 | 0 | 0 |
| 164 | 255 | 0 | 0 | 0 | 209 | 0 | 89 | 0 | 0 | 254 | 0 | 91 | 0 | 0 |
| 165 | 255 | 0 | 0 | 0 | 210 | 0 | 90 | 0 | 0 | 255 | 0 | 100 | 0 | 0 |
| 166 | 255 | 0 | 0 | 0 | 211 | 0 | 90 | 0 | 0 | | | | | |
| 167 | 255 | 0 | 0 | 0 | 212 | 0 | 90 | 0 | 0 | | | | | |

TABLE 156

| Alphanumerical Character Encoding Table (Language 5) | | | | | | | | | | | | | | |
|---|---|---|---|---|---|---|---|---|---|---|---|---|---|---|
| 0 | 255 | 0 | 0 | 0 | 41 | 255 | 0 | 0 | 0 | 82 | 0 | 93 | 0 | 0 |
| 1 | 255 | 0 | 0 | 0 | 42 | 255 | 0 | 0 | 0 | 83 | 0 | 94 | 0 | 0 |
| 2 | 255 | 0 | 0 | 0 | 43 | 255 | 0 | 0 | 0 | 84 | 0 | 95 | 0 | 0 |
| 3 | 255 | 0 | 0 | 0 | 44 | 255 | 0 | 0 | 0 | 85 | 0 | 96 | 0 | 0 |
| 4 | 255 | 0 | 0 | 0 | 45 | 255 | 0 | 0 | 0 | 86 | 0 | 97 | 0 | 0 |
| 5 | 255 | 0 | 0 | 0 | 46 | 255 | 0 | 0 | 0 | 87 | 0 | 98 | 0 | 0 |
| 6 | 255 | 0 | 0 | 0 | 47 | 255 | 0 | 0 | 0 | 88 | 0 | 99 | 0 | 0 |
| 7 | 255 | 0 | 0 | 0 | 48 | 0 | 66 | 0 | 0 | 89 | 0 | 100 | 0 | 0 |
| 8 | 255 | 0 | 0 | 0 | 49 | 0 | 67 | 0 | 0 | 90 | 0 | 101 | 0 | 0 |
| 9 | 255 | 0 | 0 | 0 | 50 | 0 | 68 | 0 | 0 | 91 | 255 | 0 | 0 | 0 |
| 10 | 255 | 0 | 0 | 0 | 51 | 0 | 69 | 0 | 0 | 92 | 255 | 0 | 0 | 0 |
| 11 | 255 | 0 | 0 | 0 | 52 | 0 | 70 | 0 | 0 | 93 | 255 | 0 | 0 | 0 |

TABLE 156-continued
Alphanumerical Character Encoding Table (Language 5)

| | | | | | | | | | | | | | | |
|---|---|---|---|---|---|---|---|---|---|---|---|---|---|---|
| 12 | 255 | 0 | 0 | 0 | 53 | 0 | 71 | 0 | 0 | 94 | 255 | 0 | 0 | 0 |
| 13 | 255 | 0 | 0 | 0 | 54 | 0 | 72 | 0 | 0 | 95 | 255 | 0 | 0 | 0 |
| 14 | 255 | 0 | 0 | 0 | 55 | 0 | 73 | 0 | 0 | 96 | 255 | 0 | 0 | 0 |
| 15 | 255 | 0 | 0 | 0 | 56 | 0 | 74 | 0 | 0 | 97 | 0 | 76 | 0 | 0 |
| 16 | 255 | 0 | 0 | 0 | 57 | 0 | 75 | 0 | 0 | 98 | 0 | 77 | 0 | 0 |
| 17 | 255 | 0 | 0 | 0 | 58 | 255 | 0 | 0 | 0 | 99 | 2 | 78 | 83 | 102 |
| 18 | 255 | 0 | 0 | 0 | 59 | 255 | 0 | 0 | 0 | 100 | 0 | 79 | 0 | 0 |
| 19 | 255 | 0 | 0 | 0 | 60 | 255 | 0 | 0 | 0 | 101 | 0 | 80 | 0 | 0 |
| 20 | 255 | 0 | 0 | 0 | 61 | 255 | 0 | 0 | 0 | 102 | 0 | 81 | 0 | 0 |
| 21 | 255 | 0 | 0 | 0 | 62 | 255 | 0 | 0 | 0 | 103 | 0 | 82 | 0 | 0 |
| 22 | 255 | 0 | 0 | 0 | 63 | 255 | 0 | 0 | 0 | 104 | 0 | 83 | 0 | 0 |
| 23 | 255 | 0 | 0 | 0 | 64 | 255 | 0 | 0 | 0 | 105 | 0 | 84 | 0 | 0 |
| 24 | 255 | 0 | 0 | 0 | 65 | 0 | 76 | 0 | 0 | 106 | 0 | 85 | 0 | 0 |
| 25 | 255 | 0 | 0 | 0 | 66 | 0 | 77 | 0 | 0 | 107 | 0 | 86 | 0 | 0 |
| 26 | 255 | 0 | 0 | 0 | 67 | 2 | 78 | 83 | 102 | 108 | 2 | 87 | 87 | 102 |
| 27 | 255 | 0 | 0 | 0 | 68 | 0 | 79 | 0 | 0 | 109 | 0 | 88 | 0 | 0 |
| 28 | 255 | 0 | 0 | 0 | 69 | 0 | 80 | 0 | 0 | 110 | 0 | 89 | 0 | 0 |
| 29 | 255 | 0 | 0 | 0 | 70 | 0 | 81 | 0 | 0 | 111 | 0 | 90 | 0 | 0 |
| 30 | 255 | 0 | 0 | 0 | 71 | 0 | 82 | 0 | 0 | 112 | 0 | 91 | 0 | 0 |
| 31 | 255 | 0 | 0 | 0 | 72 | 0 | 83 | 0 | 0 | 113 | 0 | 92 | 0 | 0 |
| 32 | 0 | 1 | 0 | 0 | 73 | 0 | 84 | 0 | 0 | 114 | 0 | 93 | 0 | 0 |
| 33 | 255 | 0 | 0 | 0 | 74 | 0 | 85 | 0 | 0 | 115 | 0 | 94 | 0 | 0 |
| 34 | 255 | 0 | 0 | 0 | 75 | 0 | 86 | 0 | 0 | 116 | 0 | 95 | 0 | 0 |
| 35 | 255 | 0 | 0 | 0 | 76 | 2 | 87 | 87 | 102 | 117 | 0 | 96 | 0 | 0 |
| 36 | 255 | 0 | 0 | 0 | 77 | 0 | 88 | 0 | 0 | 118 | 0 | 97 | 0 | 0 |
| 37 | 255 | 0 | 0 | 0 | 78 | 0 | 89 | 0 | 0 | 119 | 0 | 98 | 0 | 0 |
| 38 | 255 | 0 | 0 | 0 | 79 | 0 | 90 | 0 | 0 | 120 | 0 | 99 | 0 | 0 |
| 39 | 255 | 0 | 0 | 0 | 80 | 0 | 91 | 0 | 0 | 121 | 0 | 100 | 0 | 0 |
| 40 | 255 | 0 | 0 | 0 | 81 | 0 | 92 | 0 | 0 | 122 | 0 | 101 | 0 | 0 |
| 123 | 255 | 0 | 0 | 0 | 168 | 255 | 0 | 0 | 0 | 213 | 0 | 90 | 0 | 0 |
| 124 | 255 | 0 | 0 | 0 | 169 | 255 | 0 | 0 | 0 | 214 | 0 | 90 | 0 | 0 |
| 125 | 255 | 0 | 0 | 0 | 170 | 255 | 0 | 0 | 0 | 215 | 255 | 0 | 0 | 0 |
| 126 | 255 | 0 | 0 | 0 | 171 | 255 | 0 | 0 | 0 | 216 | 0 | 90 | 0 | 0 |
| 127 | 255 | 0 | 0 | 0 | 172 | 255 | 0 | 0 | 0 | 217 | 0 | 96 | 0 | 0 |
| 128 | 255 | 0 | 0 | 0 | 173 | 255 | 0 | 0 | 0 | 218 | 0 | 96 | 0 | 0 |
| 129 | 255 | 0 | 0 | 0 | 174 | 255 | 0 | 0 | 0 | 219 | 0 | 96 | 0 | 0 |
| 130 | 255 | 0 | 0 | 0 | 175 | 255 | 0 | 0 | 0 | 220 | 0 | 96 | 0 | 0 |
| 131 | 255 | 0 | 0 | 0 | 176 | 255 | 0 | 0 | 0 | 221 | 0 | 100 | 0 | 0 |
| 132 | 255 | 0 | 0 | 0 | 177 | 255 | 0 | 0 | 0 | 222 | 0 | 91 | 0 | 0 |
| 133 | 255 | 0 | 0 | 0 | 178 | 255 | 0 | 0 | 0 | 223 | 1 | 94 | 94 | 0 |
| 134 | 255 | 0 | 0 | 0 | 179 | 255 | 0 | 0 | 0 | 224 | 0 | 76 | 0 | 0 |
| 135 | 255 | 0 | 0 | 0 | 180 | 255 | 0 | 0 | 0 | 225 | 0 | 76 | 0 | 0 |
| 136 | 255 | 0 | 0 | 0 | 181 | 255 | 0 | 0 | 0 | 226 | 0 | 76 | 0 | 0 |
| 137 | 255 | 0 | 0 | 0 | 182 | 255 | 0 | 0 | 0 | 227 | 0 | 76 | 0 | 0 |
| 138 | 255 | 0 | 0 | 0 | 183 | 255 | 0 | 0 | 0 | 228 | 0 | 76 | 0 | 0 |
| 139 | 255 | 0 | 0 | 0 | 184 | 255 | 0 | 0 | 0 | 229 | 0 | 76 | 0 | 0 |
| 140 | 255 | 0 | 0 | 0 | 185 | 255 | 0 | 0 | 0 | 230 | 1 | 76 | 80 | 0 |
| 141 | 255 | 0 | 0 | 0 | 186 | 255 | 0 | 0 | 0 | 231 | 0 | 78 | 0 | 0 |
| 142 | 255 | 0 | 0 | 0 | 187 | 255 | 0 | 0 | 0 | 232 | 0 | 80 | 0 | 0 |
| 143 | 255 | 0 | 0 | 0 | 188 | 255 | 0 | 0 | 0 | 233 | 0 | 80 | 0 | 0 |
| 144 | 255 | 0 | 0 | 0 | 189 | 255 | 0 | 0 | 0 | 234 | 0 | 80 | 0 | 0 |
| 145 | 255 | 0 | 0 | 0 | 190 | 255 | 0 | 0 | 0 | 235 | 0 | 80 | 0 | 0 |
| 146 | 255 | 0 | 0 | 0 | 191 | 255 | 0 | 0 | 0 | 236 | 0 | 84 | 0 | 0 |
| 147 | 255 | 0 | 0 | 0 | 192 | 0 | 76 | 0 | 0 | 237 | 0 | 84 | 0 | 0 |
| 148 | 255 | 0 | 0 | 0 | 193 | 0 | 76 | 0 | 0 | 238 | 0 | 84 | 0 | 0 |
| 149 | 255 | 0 | 0 | 0 | 194 | 0 | 76 | 0 | 0 | 239 | 0 | 84 | 0 | 0 |
| 150 | 255 | 0 | 0 | 0 | 195 | 0 | 76 | 0 | 0 | 240 | 0 | 79 | 0 | 0 |
| 151 | 255 | 0 | 0 | 0 | 196 | 0 | 76 | 0 | 0 | 241 | 0 | 89 | 0 | 0 |
| 152 | 255 | 0 | 0 | 0 | 197 | 0 | 76 | 0 | 0 | 242 | 0 | 90 | 0 | 0 |
| 153 | 255 | 0 | 0 | 0 | 198 | 1 | 76 | 80 | 0 | 243 | 0 | 90 | 0 | 0 |
| 154 | 255 | 0 | 0 | 0 | 199 | 0 | 78 | 0 | 0 | 244 | 0 | 90 | 0 | 0 |
| 155 | 255 | 0 | 0 | 0 | 200 | 0 | 80 | 0 | 0 | 245 | 0 | 90 | 0 | 0 |
| 156 | 255 | 0 | 0 | 0 | 201 | 0 | 80 | 0 | 0 | 246 | 0 | 90 | 0 | 0 |
| 157 | 255 | 0 | 0 | 0 | 202 | 0 | 80 | 0 | 0 | 247 | 255 | 0 | 0 | 0 |
| 158 | 255 | 0 | 0 | 0 | 203 | 0 | 80 | 0 | 0 | 248 | 0 | 90 | 0 | 0 |
| 159 | 255 | 0 | 0 | 0 | 204 | 0 | 84 | 0 | 0 | 249 | 0 | 96 | 0 | 0 |
| 160 | 0 | 1 | 0 | 0 | 205 | 0 | 84 | 0 | 0 | 250 | 0 | 96 | 0 | 0 |
| 161 | 255 | 0 | 0 | 0 | 206 | 0 | 84 | 0 | 0 | 251 | 0 | 96 | 0 | 0 |
| 162 | 255 | 0 | 0 | 0 | 207 | 0 | 84 | 0 | 0 | 252 | 0 | 96 | 0 | 0 |
| 163 | 255 | 0 | 0 | 0 | 208 | 0 | 79 | 0 | 0 | 253 | 0 | 100 | 0 | 0 |
| 164 | 255 | 0 | 0 | 0 | 209 | 0 | 89 | 0 | 0 | 254 | 0 | 91 | 0 | 0 |
| 165 | 255 | 0 | 0 | 0 | 210 | 0 | 90 | 0 | 0 | 255 | 0 | 100 | 0 | 0 |
| 166 | 255 | 0 | 0 | 0 | 211 | 0 | 90 | 0 | 0 | | | | | |
| 167 | 255 | 0 | 0 | 0 | 212 | 0 | 90 | 0 | 0 | | | | | |

TABLE 160
Accent Priority Encoding Table (Language 1 and Language 3)

| 0 | 255 | 255 | 41 | 255 | 255 | 82 | 255 | 255 |
|---|---|---|---|---|---|---|---|---|

TABLE 160-continued
Accent Priority Encoding Table (Language 1 and Language 3)

| 1 | 255 | 255 | 42 | 255 | 255 | 83 | 255 | 255 |
|---|---|---|---|---|---|---|---|---|

TABLE 160-continued

Accent Priority Encoding Table (Language 1 and Language 3)

| | | | | | | | | |
|---|---|---|---|---|---|---|---|---|
| 2 | 255 | 255 | 43 | 255 | 255 | 84 | 255 | 255 |
| 3 | 255 | 255 | 44 | 255 | 255 | 85 | 0 | 255 |
| 4 | 255 | 255 | 45 | 255 | 255 | 86 | 255 | 255 |
| 5 | 255 | 255 | 46 | 255 | 255 | 87 | 255 | 255 |
| 6 | 255 | 255 | 47 | 255 | 255 | 88 | 255 | 255 |
| 7 | 255 | 255 | 48 | 255 | 255 | 89 | 0 | 255 |
| 8 | 255 | 255 | 49 | 255 | 255 | 90 | 255 | 255 |
| 9 | 255 | 255 | 50 | 255 | 255 | 91 | 255 | 255 |
| 12 | 255 | 255 | 51 | 255 | 255 | 92 | 255 | 255 |
| 11 | 255 | 255 | 52 | 255 | 255 | 93 | 255 | 255 |
| 12 | 255 | 255 | 53 | 255 | 255 | 94 | 255 | 255 |
| 13 | 255 | 255 | 54 | 255 | 255 | 95 | 255 | 255 |
| 14 | 255 | 255 | 55 | 255 | 255 | 96 | 255 | 255 |
| 15 | 255 | 255 | 56 | 255 | 255 | 97 | 0 | 255 |
| 16 | 255 | 255 | 57 | 255 | 255 | 98 | 255 | 255 |
| 17 | 255 | 255 | 58 | 255 | 255 | 99 | 0 | 255 |
| 18 | 255 | 255 | 59 | 255 | 255 | 100 | 0 | 255 |
| 19 | 255 | 255 | 60 | 255 | 255 | 101 | 0 | 255 |
| 20 | 255 | 255 | 61 | 255 | 255 | 102 | 255 | 255 |
| 21 | 255 | 255 | 62 | 255 | 255 | 103 | 255 | 255 |
| 22 | 255 | 255 | 63 | 255 | 255 | 104 | 255 | 255 |
| 23 | 255 | 255 | 64 | 255 | 255 | 105 | 0 | 255 |
| 24 | 255 | 255 | 65 | 0 | 255 | 106 | 255 | 255 |
| 25 | 255 | 255 | 66 | 255 | 255 | 107 | 255 | 255 |
| 26 | 255 | 255 | 67 | 0 | 255 | 108 | 255 | 255 |
| 27 | 255 | 255 | 68 | 0 | 255 | 109 | 255 | 255 |
| 28 | 255 | 255 | 69 | 0 | 255 | 110 | 0 | 255 |
| 29 | 255 | 255 | 70 | 255 | 255 | 111 | 0 | 255 |
| 30 | 255 | 255 | 71 | 255 | 255 | 112 | 0 | 255 |
| 31 | 255 | 255 | 72 | 255 | 255 | 113 | 255 | 255 |
| 32 | 255 | 255 | 73 | 0 | 255 | 114 | 255 | 255 |
| 33 | 255 | 255 | 74 | 255 | 255 | 115 | 255 | 255 |
| 34 | 255 | 255 | 75 | 255 | 255 | 116 | 255 | 255 |
| 35 | 255 | 255 | 76 | 255 | 255 | 117 | 0 | 255 |
| 36 | 255 | 255 | 77 | 255 | 255 | 118 | 255 | 255 |
| 37 | 255 | 255 | 78 | 0 | 255 | 119 | 255 | 255 |
| 38 | 255 | 255 | 79 | 0 | 255 | 120 | 255 | 255 |
| 39 | 255 | 255 | 80 | 0 | 255 | 121 | 0 | 255 |
| 40 | 255 | 255 | 81 | 255 | 255 | 122 | 255 | 255 |
| 123 | 255 | 255 | 168 | 255 | 255 | 213 | 4 | 255 |
| 124 | 255 | 255 | 169 | 255 | 255 | 214 | 5 | 255 |
| 125 | 255 | 255 | 170 | 255 | 255 | 215 | 255 | 255 |
| 126 | 255 | 255 | 171 | 255 | 255 | 216 | 9 | 255 |
| 127 | 255 | 255 | 172 | 255 | 255 | 217 | 2 | 255 |
| 128 | 255 | 255 | 173 | 255 | 255 | 218 | 1 | 255 |
| 129 | 255 | 255 | 174 | 255 | 255 | 219 | 3 | 255 |
| 130 | 255 | 255 | 175 | 255 | 255 | 220 | 5 | 255 |
| 131 | 255 | 255 | 176 | 255 | 255 | 221 | 1 | 255 |
| 132 | 255 | 255 | 177 | 255 | 255 | 222 | 10 | 255 |
| 133 | 255 | 255 | 178 | 255 | 255 | 223 | 255 | 255 |
| 134 | 255 | 255 | 179 | 255 | 255 | 224 | 2 | 255 |
| 135 | 255 | 255 | 180 | 255 | 255 | 225 | 1 | 255 |
| 136 | 255 | 255 | 181 | 255 | 255 | 226 | 3 | 255 |
| 137 | 255 | 255 | 182 | 255 | 255 | 227 | 4 | 255 |
| 138 | 255 | 255 | 183 | 255 | 255 | 228 | 5 | 255 |
| 139 | 255 | 255 | 184 | 255 | 255 | 229 | 6 | 255 |
| 140 | 255 | 255 | 185 | 255 | 255 | 230 | 0 | 0 |
| 141 | 255 | 255 | 186 | 255 | 255 | 231 | 7 | 255 |
| 142 | 255 | 255 | 187 | 255 | 255 | 232 | 2 | 255 |
| 143 | 255 | 255 | 188 | 255 | 255 | 233 | 1 | 255 |
| 144 | 255 | 255 | 189 | 255 | 255 | 234 | 3 | 255 |
| 145 | 255 | 255 | 190 | 255 | 255 | 235 | 5 | 255 |
| 146 | 255 | 255 | 191 | 255 | 255 | 236 | 2 | 255 |
| 147 | 255 | 255 | 192 | 2 | 255 | 237 | 1 | 255 |
| 148 | 255 | 255 | 193 | 1 | 255 | 238 | 3 | 255 |
| 149 | 255 | 255 | 194 | 3 | 255 | 239 | 5 | 255 |
| 150 | 255 | 255 | 195 | 4 | 255 | 240 | 8 | 255 |
| 151 | 255 | 255 | 196 | 5 | 255 | 241 | 4 | 255 |
| 152 | 255 | 255 | 197 | 6 | 255 | 242 | 2 | 255 |
| 153 | 255 | 255 | 198 | 0 | 0 | 243 | 1 | 255 |
| 154 | 255 | 255 | 199 | 7 | 255 | 244 | 3 | 255 |
| 155 | 255 | 255 | 200 | 2 | 255 | 245 | 4 | 255 |
| 156 | 255 | 255 | 201 | 1 | 255 | 246 | 5 | 255 |
| 157 | 255 | 255 | 202 | 3 | 255 | 247 | 255 | 255 |
| 158 | 255 | 255 | 203 | 5 | 255 | 248 | 9 | 255 |
| 159 | 255 | 255 | 204 | 2 | 255 | 249 | 2 | 255 |
| 160 | 255 | 255 | 205 | 1 | 255 | 250 | 1 | 255 |
| 161 | 255 | 255 | 206 | 3 | 255 | 251 | 3 | 255 |
| 162 | 255 | 255 | 207 | 5 | 255 | 252 | 5 | 255 |
| 163 | 255 | 255 | 208 | 8 | 255 | 253 | 1 | 255 |
| 164 | 255 | 255 | 209 | 4 | 255 | 254 | 10 | 255 |
| 165 | 255 | 255 | 210 | 2 | 255 | 255 | 5 | 255 |
| 166 | 255 | 255 | 211 | 1 | 255 | | | |
| 167 | 255 | 255 | 212 | 3 | 255 | | | |

TABLE 184

Non-Alphanumerical Character Encoding Table (Language 1 and Language 5)

| | | | | | | | | | | | |
|---|---|---|---|---|---|---|---|---|---|---|---|
| 0 | 255 | 44 | 13 | 88 | 255 | 132 | 255 | 176 | 48 | 220 | 255 |
| 1 | 255 | 45 | 14 | 89 | 255 | 133 | 255 | 177 | 49 | 221 | 255 |
| 2 | 255 | 46 | 15 | 90 | 255 | 134 | 255 | 178 | 50 | 222 | 255 |
| 3 | 255 | 47 | 16 | 91 | 24 | 135 | 255 | 179 | 51 | 223 | 255 |
| 4 | 255 | 48 | 255 | 92 | 25 | 136 | 255 | 180 | 52 | 224 | 255 |
| 5 | 255 | 49 | 255 | 93 | 26 | 137 | 255 | 181 | 53 | 225 | 255 |
| 6 | 255 | 50 | 255 | 94 | 27 | 138 | 255 | 182 | 54 | 226 | 255 |
| 7 | 255 | 51 | 255 | 95 | 28 | 139 | 255 | 183 | 55 | 227 | 255 |
| 8 | 255 | 52 | 255 | 96 | 29 | 140 | 255 | 184 | 56 | 228 | 255 |
| 9 | 255 | 53 | 255 | 97 | 255 | 141 | 255 | 185 | 57 | 229 | 255 |
| 10 | 255 | 54 | 255 | 98 | 255 | 142 | 255 | 186 | 58 | 230 | 255 |
| 11 | 255 | 55 | 255 | 99 | 255 | 143 | 255 | 187 | 59 | 231 | 255 |
| 12 | 255 | 56 | 255 | 100 | 255 | 144 | 255 | 188 | 60 | 232 | 255 |
| 13 | 255 | 57 | 255 | 101 | 255 | 145 | 255 | 189 | 61 | 233 | 255 |
| 14 | 255 | 58 | 17 | 102 | 255 | 146 | 255 | 190 | 62 | 234 | 255 |
| 15 | 255 | 59 | 18 | 103 | 255 | 147 | 255 | 191 | 63 | 235 | 255 |
| 16 | 255 | 60 | 19 | 104 | 255 | 148 | 255 | 192 | 255 | 236 | 255 |
| 17 | 255 | 61 | 20 | 105 | 255 | 149 | 255 | 193 | 255 | 237 | 255 |
| 18 | 255 | 62 | 21 | 106 | 255 | 150 | 255 | 194 | 255 | 238 | 255 |
| 19 | 255 | 63 | 22 | 107 | 255 | 151 | 255 | 195 | 255 | 239 | 255 |
| 20 | 255 | 64 | 23 | 108 | 255 | 152 | 255 | 196 | 255 | 240 | 255 |
| 21 | 255 | 65 | 255 | 109 | 255 | 153 | 255 | 197 | 255 | 241 | 255 |
| 22 | 255 | 66 | 255 | 110 | 255 | 154 | 255 | 198 | 255 | 242 | 255 |
| 23 | 255 | 67 | 255 | 111 | 255 | 155 | 255 | 199 | 255 | 243 | 255 |
| 24 | 255 | 68 | 255 | 112 | 255 | 156 | 255 | 200 | 255 | 244 | 255 |
| 25 | 255 | 69 | 255 | 113 | 255 | 157 | 255 | 201 | 255 | 245 | 255 |
| 26 | 255 | 70 | 255 | 114 | 255 | 158 | 255 | 202 | 255 | 246 | 255 |
| 27 | 255 | 71 | 255 | 115 | 255 | 159 | 255 | 203 | 255 | 247 | 65 |
| 28 | 255 | 72 | 255 | 116 | 255 | 160 | 1 | 204 | 255 | 248 | 255 |
| 29 | 255 | 73 | 255 | 117 | 255 | 161 | 34 | 205 | 255 | 249 | 255 |
| 30 | 255 | 74 | 255 | 118 | 255 | 162 | 35 | 206 | 255 | 250 | 255 |
| 31 | 255 | 75 | 255 | 119 | 255 | 163 | 36 | 207 | 255 | 251 | 255 |
| 32 | 1 | 76 | 255 | 120 | 255 | 164 | 37 | 208 | 255 | 252 | 255 |

TABLE 184-continued

Non-Alphanumerical Character Encoding Table (Language 1 and Language 5)

| 33 | 2  | 77 | 255 | 121 | 255 | 165 | 38 | 209 | 255 | 253 | 255 |
|----|----|----|-----|-----|-----|-----|----|-----|-----|-----|-----|
| 34 | 3  | 78 | 255 | 122 | 255 | 166 | 39 | 210 | 255 | 254 | 255 |
| 35 | 4  | 79 | 255 | 123 | 30  | 167 | 40 | 211 | 255 | 255 | 255 |
| 36 | 5  | 80 | 255 | 124 | 31  | 168 | 41 | 212 | 255 |     |     |
| 37 | 6  | 81 | 255 | 125 | 32  | 169 | 42 | 213 | 255 |     |     |
| 38 | 7  | 82 | 255 | 126 | 33  | 170 | 43 | 214 | 255 |     |     |
| 39 | 8  | 83 | 255 | 127 | 255 | 171 | 44 | 215 | 64  |     |     |
| 40 | 9  | 84 | 255 | 128 | 255 | 172 | 45 | 216 | 255 |     |     |
| 41 | 10 | 85 | 255 | 129 | 255 | 173 | 14 | 217 | 255 |     |     |
| 42 | 11 | 86 | 255 | 130 | 255 | 174 | 46 | 218 | 255 |     |     |
| 43 | 12 | 87 | 255 | 131 | 255 | 175 | 47 | 219 | 255 |     |     |

What is claimed is:

1. A machine method of generating a language dependent sortkey, to facilitate the alphabetical sorting of another alphabet using a common sorting routine, said method comprising the steps of:
   (a) storing in a master file encoded words, formed from characters each having a preselected value, to be sorted;
   (b) providing a language dependent data file having an alphanumerical encoding table for the language of said another alphabet, the table including an encoding indicator, a first sort order entry and a second sort order entry;
   (c) comparing said value of a character from one of the encoded words in the master file against the alphanumerical encoding table to determine its corresponding entry;
   (d) retrieving the encoding indicator from said table, corresponding to said corresponding entry, which indicates if the encoding process will be a one-to-one character encoding, a one-to-two character encoding, or an ignore character encoding;
   (e) if the encoding indicator indicates the encoding is one-to one, utilizing the value in the first sort order entry, for said sortkey;
   (f) if the encoding indicator indicates that the encoding is one-to-two, utilizing the values in both the first sort order entry and the second sort order entry, for said sortkey; and
   (g) if the encoding indicator indicates that the encoding is an ignore encoding, ignoring any values for said sortkey; and
   repeating from step (c) for each of the characters in the master file.

2. A machine method as defined in claim 1 in which said encoding table further includes an alternate sort order entry and said encoding indicator also indicates if the encoding process will be a potential two-to-two character encoding; and which further comprises the step of:
   (h) if the encoding indicator indicates that the encoding is a potential two-to-two character encoding, comparing the value of the second character in a character pair from the encoded words;
   if the encoding indicator confirms a two-to-two character encoding, utilizing the value in the first sort order entry and the alternate sort order entry for said sortkey;
   else utilizing the value in the first sort order entry for said sortkey, and then comparing the value of said second character repeating from step (c).

* * * * *